(12) United States Patent
Luo et al.

(10) Patent No.: US 12,604,344 B2
(45) Date of Patent: Apr. 14, 2026

(54) RANDOM ACCESS METHOD AND RELATED DEVICE

(71) Applicant: HUAWEI TECHNOLOGIES CO., LTD., Shenzhen (CN)

(72) Inventors: Hejia Luo, Hangzhou (CN); Xiaolu Wang, Hangzhou (CN); Chenlei Xu, Hangzhou (CN); Yu Wang, Hangzhou (CN); Ying Chen, Hangzhou (CN); Yinggang Du, Shenzhen (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 409 days.

(21) Appl. No.: 17/961,642

(22) Filed: Oct. 7, 2022

(65) Prior Publication Data

US 2023/0043937 A1 Feb. 9, 2023

Related U.S. Application Data

(63) Continuation of application No. PCT/CN2021/085868, filed on Apr. 8, 2021.

(30) Foreign Application Priority Data

Apr. 10, 2020 (CN) .......................... 202010281128.5

(51) Int. Cl.
 H04W 74/0833 (2024.01)
 H04W 74/08 (2024.01)
 H04W 76/10 (2018.01)

(52) U.S. Cl.
 CPC ... H04W 74/0841 (2013.01); H04W 74/0866 (2013.01); H04W 76/10 (2018.02)

(58) Field of Classification Search
 CPC ......... H04W 74/0841; H04W 74/0866; H04W 74/006; H04W 74/085; H04W 76/10
 See application file for complete search history.

(56) References Cited

U.S. PATENT DOCUMENTS

2017/0111099 A1 4/2017 Jo et al.
2017/0202029 A1* 7/2017 Qi ...................... H04W 56/001
(Continued)

FOREIGN PATENT DOCUMENTS

CN 109478955 A 3/2019
CN 109788576 A 5/2019
(Continued)

OTHER PUBLICATIONS

Polarized MIMO Slotted Aloha Random Access Scheme in Satellite Network (Year: 2017).*
(Continued)

*Primary Examiner* — Yemane Mesfin
*Assistant Examiner* — Guoxing Fan

(57) ABSTRACT

The technology of this application relates to a random access method, applied to the communication field. The method includes a terminal device sends, to a network device, a first message used to establish a wireless connection, the terminal device receives, a connection response sent by the network device, where the connection response includes information about a first polarization parameter, and when accessing the network device based on the connection response, the terminal device determines, based on the information about the first polarization parameter included in the connection response, whether the terminal device is qualified to access the network device. A dimension, namely, a polarization parameter, is introduced into a random access procedure, so that a preamble capacity is increased, a problem that the network device cannot identify a colliding terminal device is alleviated, and efficiency of establishing a (Continued)

communication connection between the terminal device and the network device is improved.

19 Claims, 9 Drawing Sheets

(56) References Cited

U.S. PATENT DOCUMENTS

| | | | | |
|---|---|---|---|---|
| 2019/0053286 | A1* | 2/2019 | Cho | H04B 7/0617 |
| 2020/0107370 | A1* | 4/2020 | Wei | H04W 72/23 |
| 2022/0337308 | A1* | 10/2022 | Liberg | H04B 7/0628 |
| 2022/0352971 | A1* | 11/2022 | Liberg | H04B 7/18519 |

FOREIGN PATENT DOCUMENTS

| | | |
|---|---|---|
| CN | 110831241 A | 2/2020 |
| WO | 2018017920 A1 | 1/2018 |
| WO | 2020056737 A1 | 3/2020 |
| WO | 2020063862 A1 | 4/2020 |

OTHER PUBLICATIONS

3GPP TR 38.802 V1.2.0 (Feb. 2017), 3rd Generation Partnership Project; Technical Specification Group Radio Access Network; Study on New Radio (NR) Access Technology; Physical Layer Aspects (Release 14), 83 pages.

3GPP TR 38.802 V1.2.0 (Feb. 2017), 3rd Generation Partnership Project; Technical Specification Group Radio Access Network; Study on New Radio (NR) Access Technology Physical Layer Aspects (Release 14), 82 pages.

3GPP TS 38.211 V16.1.0 (Mar. 2020), 3rd Generation Partnership Project; Technical Specification Group Radio Access Network; NR; Physical channels and modulation (Release 16), 130 pages.

R1-1912724, Ericsson, On physical layer control procedures for NTN, 3GPP TSG-RAN WG1 Meeting #99, Reno, USA, Nov. 18-22, 2019, 13 pages.

3GPP TS 38.300 V16.1.0 (Mar. 2020), 3rd Generation Partnership Project; Technical Specification Group Radio Access Network; NR; NR and NG-RAN Overall Description; Stage 2 (Release 16), 133 pages.

R1-1912902, Panasonic, Discussion on beam management and polarization for NTN, 3GPP TSG RAN WG1 #99, Reno, USA, Nov. 18-22, 2019, 3 pages.

3GPP TS 38.331 V16.0.0 (Mar. 2020), 3rd Generation Partnership Project; Technical Specification Group Radio Access Network; NR; Radio Resource Control (RRC) protocol specification (Release 16), 834 pages.

Office Action for Chinese Application No. 202010281128 dated Nov. 25, 2022, 6 pages.

Extended European Search Report for EP Application No. 21784681 dated Jul. 14, 2023, 9 pages.

International Search Report for PCT/CN2021/085868 dated Apr. 8, 2021, 9 pages.

* cited by examiner

101 —— Network device

102 Terminal device

103 Terminal device

104 Terminal device

```
LogicalChannelConfig ::= SEQUENCE {
    ul-SpecificParameters       SEQUENCE {
        priority INTEGER (1..16),
        prioritisedBitRate                          ENUMERATED {kBps0, kBps8, kBps16, kBps32,
                                                        kBps64, kBps128, kBps256, kBps512,
                                                        kBps1024, kBps2048, kBps4096,
                                                        kBps8192, kBps16384, kBps32768,
                                                        kBps65536, infinity},
        bucketSizeDuration                          ENUMERATED {ms5, ms10, ms20, ms50, ms100, ms150,
                                                        ms300, ms500, ms1000,
                                                        spare7, spare6, spare5, spare4,
                                                        spare3,spare2, spare1},
        allowedServingCells                         SEQUENCE (SIZE (1..maxNrofServingCells-1)) OF
                                                        ServCellIndex  OPTIONAL,
        allowedSCS-List                             SEQUENCE (SIZE (1..maxSCSs)) OF SubcarrierSpacing
        maxPUSCH-Duration                           ENUMERATED {ms0p02, ms0p04, ms0p0625, ms0p125,
                                                        ms0p25, ms0p5, spare2, spare1}
        configuredGrantType1Allowed                 ENUMERATED {true} OPTIONAL,
        logicalChannelGroup                         INTEGER (0..maxLCG-ID) OPTIONAL, -- Need R
        schedulingRequestID                         SchedulingRequestId OPTIONAL, -- Need R
        logicalChannelSR-Mask                       BOOLEAN,
        logicalChannelSR- DelayTimerApplied         BOOLEAN,
        logicalChannelSR-polarization               LHCP/RHCP,
        ....
        bitRateQueryProhibitTimer                   ENUMERATED { s0, s0dot4, s0dot8, s1dot6,
                                                        s3, s6, s12,s30} OPTIONAL -- Need R
} OPTIONAL, -- Cond UL
```

FIG. 4a

```
|   +-radioResourceConfigCommon ::= SEQUENCE
|   |  +-rach-ConfigCommon ::= SEQUENCE
|   |  +-bcch-Config ::= SEQUENCE
|   |  +-pcch-Config ::= SEQUENCE
|   |  +-prach-Config ::= SEQUENCE
|   |  +-pdsch-ConfigCommon ::= SEQUENCE
|   |  +-pusch-ConfigCommon ::= SEQUENCE
|   |  +-pucch-ConfigCommon ::= SEQUENCE
|   |  +-soundingRS-UL-ConfigCommon ::= CHOICE [setup]
|   |  | +-setup ::= SEQUENCE [0]
|   |  | |   +-srs-BandwidthConfig ::= ENUMERATED [bw2]
|   |  | |   +-srs-SubframeConfig ::= ENUMERATED [sc0]
|   |  | |   +-ackNackSRS-SimultaneousTransmission ::= BOOLEAN [TRUE]
|   |  | |   +-srs-MaxUpPts ::= ENUMERATED OPTIONAL:Omit
|   |  | |   +-srs-polarization ::= LHCP/RHCP
|   |  +-uplinkPowerControlCommon ::= SEQUENCE
|   |  +-ul-CyclicPrefixLength ::= ENUMERATED [len1]
```

FIG. 4b

RANDOM ACCESS METHOD AND RELATED DEVICE

CROSS-REFERENCE TO RELATED APPLICATIONS

This application is a continuation of International Application No. PCT/CN2021/085868, filed on Apr. 8, 2021, which claims priority to Chinese Patent Application No. 202010281128.5, filed on Apr. 10, 2020. The disclosures of the aforementioned applications are hereby incorporated by reference in their entireties.

TECHNICAL FIELD

Embodiments of this application relate to the communication field, and in particular, to a random access method and a related device.

BACKGROUND

According to a protocol standard for a fifth generation cellular mobile communication system formulated by the Third Generation Partnership Project (3GPP) standard organization, compared with a long term evolution (LTE) system, a new radio (NR) system supports a larger transmission bandwidth, more transceiver antenna arrays, a higher transmission rate, and a more flexible and smaller-granularity scheduling mechanism. The foregoing features of the NR system provide more application scopes.

In an existing communication mechanism, when a terminal device exchanges data with a network device, the terminal device may request, by sending a preamble to the network device, to establish a communication connection to the network device. The network device may identify an identity of the terminal device based on the preamble.

With emergence of application scenarios such as massive machine type communication (mMTC), a quantity of users also increases. The existing communication mechanism cannot meet a communication requirement between the terminal device and the network device. A random access process is used as an example. When two terminal devices send a same preamble to a network device, the terminal devices used by users collide. In the existing communication mechanism, because a preamble capacity is small, a probability that a collision occurs on terminal devices is high, and the network device often cannot identify the colliding terminal devices. Efficiency of establishing a communication connection between the terminal device and the network device is low.

SUMMARY

Embodiments of this application provide a random access method. When accessing a network device based on a connection response, a terminal device may determine, based on information about a first polarization parameter included in the connection response, whether the terminal device is qualified to access the network device. A dimension, namely, a polarization parameter, is introduced, so that a preamble capacity is increased, and a problem that the network device cannot identify a colliding terminal device is alleviated.

A first aspect of this application provides a random access method. In the method, a terminal device sends a first message to a network device, where the first message is used to request the network device to establish a wireless connection to the terminal device. The terminal device receives a connection response sent by the network device, where the connection response includes information about a first polarization parameter. The terminal device accesses the network device based on the connection response.

The terminal device sends the first message used to establish the wireless connection to the network device. The terminal device receives the connection response sent by the network device, where the connection response includes the information about the first polarization parameter. When accessing the network device based on the connection response, the terminal device determines, based on the information about the first polarization parameter included in the connection response, whether the terminal device is qualified to access the network device. A dimension, namely, a polarization parameter, is introduced into a random access procedure, so that a preamble capacity is increased, a problem that the network device cannot identify a colliding terminal device is alleviated, and efficiency of establishing a communication connection between the terminal device and the network device is improved.

In a possible implementation of the first aspect, the implementation further includes the following step: Before the terminal device sends the first message to the network device, the terminal device receives configuration information sent by the network device, where the configuration information indicates the terminal device to configure at least one of a sequence identity ID, a time-frequency resource, a space domain resource, and a polarization mode of the first message based on the configuration information.

In this possible implementation, the sequence ID may be a preamble ID. A connection request message sent by the terminal device includes a preamble. The terminal device may select, from a preamble resource pool based on the configuration information, a preamble indicated by a preamble ID that meets a requirement. The time-frequency resource may include a time domain resource and a frequency domain resource. The terminal device may determine, based on the configuration information, to send the connection request message by using a type of time domain resource and/or frequency domain resource that meet a requirement. The polarization mode is a polarization mode used when the terminal device sends the first message. In this possible implementation, the terminal device may configure a related parameter of the first message based on the configuration information and then send the first message to the network device, so that the network device can more accurately determine whether the terminal device meets a match condition.

In a possible implementation of the first aspect, the configuration information includes index information, and the index information indicates the terminal device to configure at least one of the sequence ID, the time-frequency resource, the space domain resource, and the polarization mode of the first message based on the index information.

In this possible implementation, the index information included in the configuration information may be a PRACH configuration index. The terminal device may configure the first message based on the index information. The terminal device sends the configured first message to the network device.

In a possible implementation of the first aspect, the terminal device accesses the network device based on the connection response. The foregoing step includes: The terminal device determines, based on the connection response, whether the terminal device meets the match condition. If the terminal meets the match condition, the terminal device accesses the network device.

In this possible implementation, the terminal device determines, based on the connection response, whether the terminal device meets the match condition. In this way, a random access process is more accurate, and the terminal device that meets the match condition can be selected more accurately.

In a possible implementation of the first aspect, the implementation further includes the following steps: The terminal device determines a second polarization parameter, where the second polarization parameter is a polarization parameter used when the terminal device sends the first message. The terminal device obtains a first identity based on the second polarization parameter, where the first identity indicates the terminal device to determine, based on the first identity, whether the terminal device meets the match condition.

In this possible implementation, the second polarization parameter is a polarization parameter used when the terminal device sends the first message. If the terminal device sends the connection request message in a left-handed circular polarization mode, the second polarization parameter is a polarization parameter corresponding to the left-handed circular polarization mode. If the terminal device sends the connection request message in a right-handed circular polarization mode, the second polarization parameter is a polarization parameter corresponding to the right-handed circular polarization mode. The terminal device obtains the first identity based on the second polarization parameter. The dimension, namely, the polarization parameter is introduced into a manner of obtaining the first identity, so that a sample capacity of the first identity is increased.

In a possible implementation of the first aspect, the connection response includes a second identity, and the second identity is related to the first polarization parameter. The implementation further includes: The terminal device obtains the second identity based on the connection response. That the terminal device determines, based on the connection response, whether the terminal device meets the match condition includes: The terminal device determines whether the second identity is the same as the first identity. If the second identity is the same as the first identity, the terminal device determines that the terminal device meets the match condition.

In this possible implementation, when the terminal device determines that the second identity is the same as the first identity, the terminal device determines that the terminal device meets the match condition. In this possible implementation, an identity obtained based on the polarization parameter and another related parameter is used as a criterion for determining whether the terminal device meets the match condition, so that whether the terminal device meets the match condition can be more accurately determined.

In a possible implementation of the first aspect, the first identity is a first random access radio network temporary identifier (RA-RNTI), and the second identity is a second RA-RNTI.

In a possible implementation of the first aspect, the connection response includes a parameter field of the first polarization parameter, and the parameter field of the first polarization parameter is used to determine whether the terminal device meets the match condition. The implementation further includes the following steps: The terminal device obtains a parameter field of the second polarization parameter. The terminal device determines, based on the connection response, that the terminal device meets the match condition includes: The terminal device obtains the parameter field of the first polarization parameter based on the connection response. The terminal device determines whether the parameter field of the first polarization parameter is the same as the parameter field of the second polarization parameter. If the parameter field of the first polarization parameter is the same as the parameter field of the second polarization parameter, the terminal device determines that the terminal device meets the match condition.

In this possible implementation, when the terminal device determines that the parameter field of the first polarization parameter is the same as the parameter field of the second polarization parameter, the terminal device determines that the terminal device meets the match condition. In this possible implementation, the parameter field of the polarization parameter is used as a criterion for determining whether the terminal device meets the match condition, so that whether the terminal device meets the match condition can be more accurately determined.

A second aspect of this application provides a random access method. In the method, a network device receives a second message sent by a terminal device, where the second message is used to request the network device to establish a wireless connection to the terminal device. The network device determines a first polarization parameter based on the second message, where the first polarization parameter is a polarization parameter used when the terminal device sends the second message. The network device determines, based on the second message and the first polarization parameter, whether the terminal device meets a match condition. The network device sends a connection response to the terminal device if the terminal device meets the match condition, where the connection response includes information about the first polarization parameter, and the connection response indicates the terminal device to access the network device.

In this embodiment of this application, after the network device receives the second message sent by the terminal device, the network device determines the first polarization parameter based on the second message. In this way, the network device may determine, based on the second message and the first polarization parameter, whether the terminal device meets the match condition. If the terminal device meets the match condition, the network device sends the connection response to the terminal device. The network device may determine, based on the first polarization parameter, whether the terminal device is qualified to access the network device. In this embodiment of this application, accuracy of determining, by the network device, whether the terminal device meets the match condition is improved.

In a possible implementation of the second aspect, the implementation further includes the following step: Before the network device receives the second message sent by the terminal device, the network device sends configuration information to the terminal device, where the configuration information indicates the terminal device to configure at least one of a sequence ID, a time-frequency resource, a space domain resource, and a polarization mode of the second message based on the configuration information.

In this possible implementation, the network device may indicate the terminal device to configure a related parameter of the first message based on the configuration information. After the terminal device configures the first message based on a requirement in the configuration information, the terminal device sends the configured first message to the network device, so that the network device can more accurately determine whether the terminal device meets the match condition.

In a possible implementation of the second aspect, the configuration information includes index information, and the index information indicates the terminal device to configure at least one of the sequence ID, the time-frequency resource, the space domain resource, and the polarization mode of the first message based on the index information.

The index information included in the configuration information may be a PRACH configuration index. The network device may indicate the terminal device to configure the first message based on the index information.

In a possible implementation of the second aspect, the connection response includes a second identity, and the second identity is obtained based on the first polarization parameter. The implementation further includes the following step: The network device obtains the second identity based on the first polarization parameter, where the second identity indicates the terminal device to determine, based on the second identity, whether the terminal device meets the match condition.

In this possible implementation, the network device obtains the second identity based on the first polarization parameter. In this possible implementation, the second identity obtained based on the polarization parameter and another related parameter is used as a criterion for determining whether the terminal device meets the match condition. In this way, whether the terminal device meets the match condition can be more accurately determined.

In a possible implementation of the second aspect, the second identity is a second RA-RNTI.

This possible implementation provides a specific implementation form of the second identity.

In a possible implementation of the second aspect, the connection response includes a parameter field of the first polarization parameter, and the parameter field of the first polarization parameter indicates the terminal device to determine, based on the parameter field of the first polarization parameter, whether the terminal device meets the match condition.

In this possible implementation, the network device may indicate the terminal device to determine, based on the parameter field of the first polarization parameter included in the connection response, whether the terminal device meets the match condition.

A third aspect of this application provides a terminal device. In the terminal device, a sending unit is configured to send a first message to a network device, where the first message is used to request the network device to establish a wireless connection to the terminal device. A receiving unit is configured to receive a connection response sent by the network device, where the connection response includes information about a first polarization parameter. A processing unit is configured to access the network device based on the connection response.

In this embodiment of this application, after the terminal device sends the first message to the network device, the terminal device may receive the connection response sent by the network device. The connection response includes the information about the first polarization parameter. The terminal device accesses the network device based on the connection response. When accessing the network device based on the connection response, the terminal device may determine, based on the information about the first polarization parameter included in the connection response, whether the terminal device is qualified to access the network device. An additional verification manner is added. In this embodiment of this application, accuracy of determining, by the terminal device, whether the terminal device meets a match condition is improved.

In a possible implementation of the third aspect, the receiving unit is further configured to: before the sending unit sends the first message to the network device, receive configuration information sent by the network device, where the configuration information indicates the terminal device to configure at least one of a sequence identity ID, a time-frequency resource, a space domain resource, and a polarization mode of the first message based on the configuration information.

In this possible implementation, the sequence ID may be a preamble ID. A connection request message sent by the terminal device includes a preamble. The terminal device may select, from a preamble resource pool based on the configuration information, a preamble indicated by a preamble ID that meets a requirement. The time-frequency resource may include a time domain resource and a frequency domain resource. The terminal device may determine, based on the configuration information, to send the connection request message by using a type of time domain resource and/or frequency domain resource that meet a requirement. The polarization mode is a polarization mode used when the terminal device sends the first message. In this possible implementation, the terminal device may configure a related parameter of the first message based on the configuration information and then send the first message to the network device, so that the network device can more accurately determine whether the terminal device meets the match condition.

In a possible implementation of the third aspect, the configuration information includes index information, and the index information indicates the terminal device to configure at least one of the sequence ID, the time-frequency resource, the space domain resource, and the polarization mode of the first message based on the index information.

In this possible implementation, the index information included in the configuration information may be a PRACH configuration index. The terminal device may configure the first message based on the index information. The terminal device sends the configured first message to the network device.

In a possible implementation of the third aspect, the processing unit is configured to determine, based on the connection response, whether the terminal device meets the match condition. If the terminal meets the match condition, the processing unit indicates the terminal device to access the network device.

In this possible implementation, the terminal device determines, based on the connection response, whether the terminal device meets the match condition. In this way, a random access process is more accurate, and the terminal device that meets the match condition can be selected more accurately.

In a possible implementation of the third aspect, the processing unit is further configured to: determine a second polarization parameter, where the second polarization parameter is a polarization parameter used when the terminal device sends the first message; and obtain a first identity based on the second polarization parameter, where the first identity indicates the terminal device to determine, based on the first identity, whether the terminal device meets the match condition.

In this possible implementation, the second polarization parameter is a polarization parameter used when the terminal device sends the first message. If the terminal device sends the connection request message in a left-handed circular polarization mode, the second polarization parameter is a polarization parameter corresponding to the left-handed circular polarization mode. If the terminal device sends the connection request message in a right-handed circular polarization mode, the second polarization parameter is a polarization parameter corresponding to the right-handed circular polarization mode. The terminal device obtains the first identity based on the second polarization parameter. A dimension, namely, a polarization parameter is introduced into a manner of obtaining the first identity, so that a sample capacity of the first identity is increased.

In a possible implementation of the third aspect, the connection response includes a second identity, and the second identity is related to the first polarization parameter. The processing unit is further configured to: obtain the second identity based on the connection response; determine whether the second identity is the same as the first identity; and if the second identity is the same as the first identity, determine that the terminal device meets the match condition.

In a possible implementation of the third aspect, the first identity is a first access radio network temporary identifier RA-RNTI, and the second identity is a second RA-RNTI.

In a possible implementation of the third aspect, the connection response includes a parameter field of the first polarization parameter, and the parameter field of the first polarization parameter is used to determine whether the terminal device meets the match condition. The processing unit is further configured to: obtain a parameter field of the second polarization parameter; obtain the parameter field of the first polarization parameter based on the connection response; determine whether the parameter field of the first polarization parameter is the same as the parameter field of the second polarization parameter; and if the parameter field of the first polarization parameter is the same as the parameter field of the second polarization parameter, determine that the terminal device meets the match condition.

In this possible implementation, when the terminal device determines that the parameter field of the first polarization parameter is the same as the parameter field of the second polarization parameter, the terminal device determines that the terminal device meets the match condition. In this possible implementation, the parameter field of the polarization parameter is used as a criterion for determining whether the terminal device meets the match condition, so that whether the terminal device meets the match condition can be more accurately determined.

A fourth aspect of this application provides a network device. In the network device, a receiving unit is configured to receive a second message sent by a terminal device, where the second message is used to request the network device to establish a wireless connection to the terminal device. A processing unit is configured to: determine a first polarization parameter based on the second message, where the first polarization parameter is a polarization parameter used when the terminal device sends the second message; and determine, based on the second message and the first polarization parameter, whether the terminal device meets a match condition. A sending unit is configured to send a connection response to the terminal device if the terminal device meets the match condition, where the connection response includes information about the first polarization parameter, and the connection response indicates the terminal device to access the network device.

In this embodiment of this application, after the network device receives the second message sent by the terminal device, the network device determines the first polarization parameter based on the second message. In this way, the network device may determine, based on the second message and the first polarization parameter, whether the terminal device meets the match condition. If the terminal device meets the match condition, the network device sends the connection response to the terminal device. The network device may determine, based on the first polarization parameter, whether the terminal device is qualified to access the network device. In this embodiment of this application, accuracy of determining, by the network device, whether the terminal device meets the match condition is improved.

In a possible implementation of the fourth aspect, the sending unit is further configured to send configuration information to the terminal device before the receiving unit receives the second message sent by the terminal, where the configuration information indicates the terminal device to configure at least one of a sequence ID, a time-frequency resource, a space domain resource, and a polarization mode of the second message based on the configuration information.

In this possible implementation, the network device may indicate the terminal device to configure a related parameter of the second message based on the configuration information. After the terminal device configures the second message based on a requirement in the configuration information, the terminal device sends the configured second message to the network device, so that the network device can more accurately determine whether the terminal device meets the match condition.

In a possible implementation of the fourth aspect, the configuration information includes index information, and the index information indicates the terminal device to configure at least one of the sequence ID, the time-frequency resource, the space domain resource, and the polarization mode of the second message based on the index information.

The index information included in the configuration information may be a PRACH configuration index. The network device may indicate the terminal device to configure the second message based on the index information.

In a possible implementation of the fourth aspect, the connection response includes a second identity, and the second identity is obtained based on the first polarization parameter. The processing unit is further configured to: obtain the second identity based on the first polarization parameter, where the second identity indicates the terminal device to determine, based on the second identity, whether the terminal device meets the match condition.

In this possible implementation, the network device obtains the second identity based on the first polarization parameter. In this possible implementation, the second identity obtained based on the polarization parameter and another related parameter is used as a criterion for determining whether the terminal device meets the match condition. In this way, whether the terminal device meets the match condition can be more accurately determined.

In a possible implementation of the fourth aspect, the second identity is a second RA-RNTI.

In a possible implementation of the fourth aspect, the connection response includes a parameter field of the first polarization parameter, and the parameter field of the first polarization parameter indicates the terminal device to determine, based on the parameter field of the first polarization parameter, whether the terminal device meets the match condition.

In this possible implementation, the network device may indicate the terminal device to determine, based on the parameter field of the first polarization parameter included in the connection response, whether the terminal device meets the match condition.

A fifth aspect of this application provides a terminal device. The terminal device includes at least one input interface, a logic circuit, and an output interface. The output interface is configured to send a first message to a network device. The input interface is configured to receive a connection response sent by the network device and receive configuration information sent by the network device. When instructions are executed by the logic circuit, the method in any one of the first aspect or the possible implementations of the first aspect is performed.

A sixth aspect of this application provides a network device. The network device includes at least one input interface, a logic circuit, and an output interface. The input interface is configured to receive a second message sent by a terminal device. The output interface is configured to send a connection response to the terminal device and send configuration information to the terminal device. When instructions are executed by the logic circuit, the method in any one of the second aspect or the possible implementations of the second aspect is performed.

A seventh aspect of this application provides a terminal device. The terminal device includes at least one processor, a memory, and a communication interface. The processor is connected to the memory and the communication interface. The communication interface is configured to: send a first message to a network device, receive a connection response sent by the network device, and receive configuration information sent by the network device. After the processor is configured to read instructions stored in the memory, the method in any one of the first aspect or the possible implementations of the first aspect is performed.

An eighth aspect of this application provides a network device. The network device includes at least one processor, a memory, and a communication interface. The processor is connected to the memory and the communication interface. The communication interface is configured to: receive a first message sent by a terminal device, send a connection response to the terminal device, and send configuration information to the terminal device. After the processor is configured to read instructions stored in the memory, the method in any one of the second aspect or the possible implementations of the second aspect is performed.

A ninth aspect of this application provides a terminal device. The device includes a processor, and the processor is coupled to a memory. The memory is configured to store a computer program or instructions, and the processor is configured to execute the computer program or instructions in the memory, so that the method in any one of the first aspect or the possible implementations of the first aspect is performed.

A tenth aspect of this application provides a network device. The device includes a processor, and the processor is coupled to a memory. The memory is configured to store a computer program or instructions, and the processor is configured to execute the computer program or instructions in the memory, so that the method in any one of the second aspect or the possible implementations of the second aspect is performed.

An eleventh aspect of this application provides a computer-readable storage medium. The computer-readable storage medium stores a program, and the program enables the method in any one of the first aspect or the possible implementations of the first aspect to be performed.

A twelfth aspect of this application provides a computer-readable storage medium. The computer-readable storage medium stores a program, and the program enables the method in any one of the second aspect or the possible implementations of the second aspect to be performed.

A thirteenth aspect of this application provides a computer program product that stores one or more computer-executable instructions. When the computer-executable instructions are executed by a processor, the method in any one of the first aspect or the possible implementations of the first aspect is performed.

A fourteenth aspect of this application provides a computer program product that stores one or more computer-executable instructions. When the computer-executable instructions are executed by a processor, the method in any one of the second aspect or the possible implementations of the second aspect is performed.

A fifteenth aspect of this application provides a chip system. The chip system includes a processor, configured to support a terminal device or a network device to implement functions in the foregoing aspects, for example, send or process data and/or information in the foregoing methods. In a possible implementation, the chip system further includes a memory. The memory is configured to store necessary program instructions and data. The chip system may include a chip, or may include a chip and another discrete component.

A sixteenth aspect of this application provides a communication apparatus. The communication apparatus includes at least one logic circuit and an input/output interface. The input/output interface is configured to: send a first message to a network device, receive a connection response sent by the network device, and receive configuration information sent by the network device. The logic circuit is configured to enable the method in any one of the first aspect or the possible implementations of the first aspect to be performed.

A seventeenth aspect of this application provides a communication apparatus. The communication apparatus includes at least one logic circuit and an input/output interface. The input/output interface is configured to: receive a second message sent by a terminal device, send a connection response to the terminal device, and send configuration information to the terminal device. The logic circuit is configured to enable the method in any one of the second aspect or the possible implementations of the second aspect to be performed.

An eighteenth aspect of this application provides a computer program product, where the computer program product includes instructions. When the instructions are run on a computer, the method in any one of the first aspect or the possible implementations of the first aspect is performed.

A nineteenth aspect of this application provides a computer program product, where the computer program product includes instructions. When the instructions are run on a computer, the method in any one of the second aspect or the possible implementations of the second aspect is performed.

A twentieth aspect of this application provides a computer program, where the computer program includes instructions. When the instructions are run on a computer, the method in any one of the first aspect or the possible implementations of the first aspect is performed.

A twenty-first aspect of this application provides a computer program, where the computer program includes instructions. When the instructions are run on a computer, the method in any one of the second aspect or the possible implementations of the second aspect is performed.

According to the foregoing technical solutions, it can be learned that embodiments of this application have the following advantages:

The terminal device sends the first message used to establish the wireless connection to the network device. The terminal device receives the connection response sent by the network device, where the connection response includes the information about the first polarization parameter. When accessing the network device based on the connection response, the terminal device determines, based on the information about the first polarization parameter included in the connection response, whether the terminal device is qualified to access the network device. The dimension, namely, the polarization parameter, is introduced into the random access procedure, so that the preamble capacity is increased, the problem that the network device cannot identify the colliding terminal device is alleviated, and the efficiency of establishing the communication connection between the terminal device and the network device is improved.

BRIEF DESCRIPTION OF DRAWINGS

FIG. 4*a* is an example schematic diagram of another embodiment of a random access method according to an embodiment of this application;

FIG. 4*b* is an example schematic diagram of another embodiment of a random access method according to an embodiment of this application;

DESCRIPTION OF EMBODIMENTS

Figure 1:
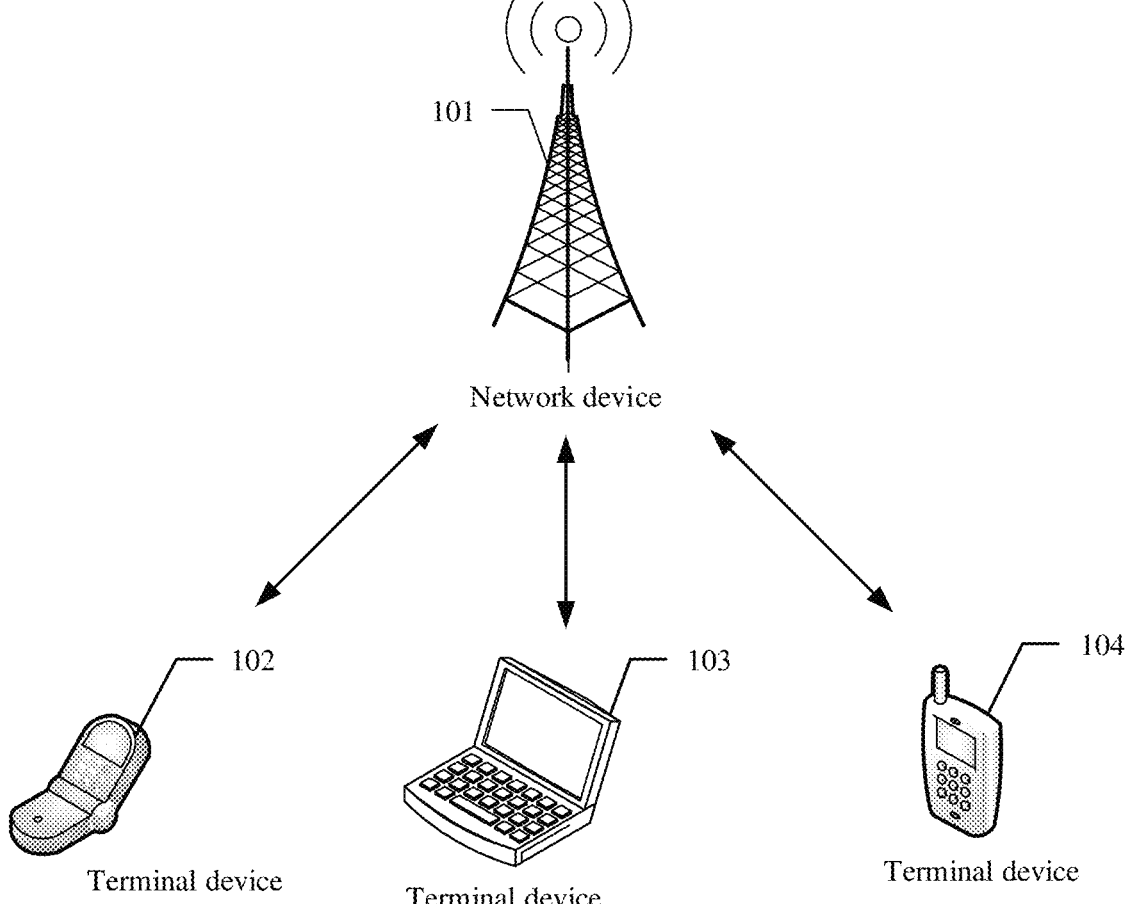
FIG. 1 is an example schematic diagram of an application scenario of a communication system according to an embodiment of this application.

The following describes embodiments of this application with reference to accompanying drawings. A person of ordinary skill in the art may learn that, with development of technologies and emergence of new scenarios, technical solutions provided in embodiments of this application are also applicable to similar technical problems.

In the specification, claims, and accompanying drawings of this application, the terms "first", "second", and so on are intended to distinguish between similar objects but do not necessarily indicate a specific order or sequence. It should be understood that data termed in such a way is interchangeable in proper circumstances, so that embodiments described herein can be implemented in other orders than the order illustrated or described herein.

In embodiments of this application, the word "example" or "for example" is used to represent giving an example, an illustration, or a description. Any embodiment or implementation scheme described as an "example" or "for example" in embodiments of this application should not be explained as being more preferred or having more advantages than another embodiment or implementation scheme. Exactly, use of the word such as "example" or "for example" is intended to present a relative concept in a specific manner for ease of understanding.

The term "and/or" in this application describes only an association relationship of associated objects and represents that at least three relationships may exist. For example, A and/or B may represent the following three cases: Only A exists, both A and B exist, and only B exists, where A and B may be singular or plural. In addition, in the descriptions of this application, unless otherwise stated, "a plurality of" means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

Communication systems to which the technical solutions in embodiments of this application may be applied include but are not limited to three application scenarios of a narrowband internet of things (NB-IoT for short), a long term evolution (LTE for short) system, and a 5G mobile communication system: enhanced mobile broadband (eMBB), ultra-reliable low-latency communication (URLLC), and massive machine type communication (mMTC), or a new communication system emerging in the future.

A physical random access channel (PRACH) is an access channel used when a terminal device starts to initiate a call. When the terminal device determines, based on a service requirement, that the terminal device needs to access a network device, the terminal device may send a connection request message to the network device on the PRACH. The connection request message may include a preamble identity (ID) and another related parameter. After the network device receives the connection request message sent by the terminal device, the network device may obtain, based on the connection request message, the preamble ID and the another related parameter that are included in the message, and may further obtain a random access radio network temporary identifier (RA-RNTI) of the terminal device based on a time-frequency resource used when the terminal device sends the connection request message. In a random access process, the RA-RNTI is an identifier of the terminal device when the terminal device sends the connection request message to the network device. After the network device determines, based on the preamble ID, the RA-RNTI, and the another related parameter, that the terminal device meets a match condition, the network device sends a connection response to a plurality of terminal devices in a broadcast or multicast manner. The connection response includes the RA-RNTI of the terminal device that meets the match condition. After receiving the connection response, the terminal device obtains an RA-RNTI included in the connection response. The terminal device may determine whether the RA-RNTI included in the connection response is consistent with the RA-RNTI of the terminal device. If the RA-RNTI included in the connection response is consistent with the RA-RNTI of the terminal device, the terminal device determines that the terminal device meets the match condition.

Different polarization parameters are used when the terminal device sends the connection request message. For example, when sending the connection request message in a circular polarization mode, the terminal device may send the connection request message in a left-handed circular polarization mode, or may send the connection request message in a right-handed circular polarization mode. There are different polarization parameters when the connection request message is sent in different polarization modes. In the random access process, a polarization mode used when the terminal device accesses the network device is not considered, and two uplink signals on a polarization channel may have a same identifier. As a result, the network device cannot identify a user collision.

For the foregoing problem, this application provides a random access method and a related device. A dimension, namely, a polarization mode, is added to the random access process, so that a preamble capacity is increased, and a problem that the network device cannot identify a colliding terminal device is alleviated.

FIG. 1 is a schematic diagram of an application scenario of a communication system according to an embodiment of this application.

Refer to FIG. 1. In this embodiment of this application, a terminal device and a network device form a random access system.

The communication system provided in this embodiment of this application includes a network device 101, a terminal device 102, a terminal device 103, and a terminal device 104.

The terminal device 102 exchanges data with the network device 101, the terminal device 103 exchanges data with the network device 101, and the terminal device 104 exchanges data with the network device 101.

In this embodiment of this application, only one network device and three terminal devices are used as an example for description. In actual application, optionally, the application scenario of this embodiment of this application may include a plurality of network devices and more or fewer terminal devices than those provided in the embodiment in FIG. 1. A quantity of network devices and a quantity of terminal devices are not limited in this embodiment of this application.

The network device 101 in this embodiment of this application may be any device having a wireless sending/receiving function. The network device 101 includes a base station (BS), and may be a device that is deployed in a radio access network and that can perform wireless communication with the terminal device. The base station may be in a plurality of forms, for example, a macro base station, a micro base station, a relay station, and an access point. The base station in embodiments of this application may be a base station in a 5G system or a base station in an LTE system. The base station in the 5G system may also be referred to as a transmission reception point (TRP) or a next generation NodeB (gNB, or gNodeB). In embodiments of this application, an apparatus configured to implement a function of the network device may be a network device, or may be an apparatus, for example, a chip system, that can support the network device to implement the function. The apparatus may be deployed on the network device, or may be used together with the network device. In the technical solutions provided in embodiments of this application, the technical solutions provided in embodiments of this application are described by using an example in which the apparatus configured to implement the function of the network device is the network device.

The terminal device in this embodiment of this application may be a device that provides voice and/or data connectivity for a user, a handheld device with a wireless connection function, or another processing device connected to a wireless modem. The terminal device may be a mobile terminal, for example, a mobile phone (or referred to as a "cellular" phone), and a computer that has a mobile terminal. For example, the terminal device may be a portable, pocket-size, handheld, computer built-in, or vehicle-mounted mobile apparatus. These mobile apparatuses exchange voice and/or data with the network device. For example, the terminal device is a device such as a personal communication service (PCS) phone, a cordless phone, a session initiation protocol (SIP) phone, a wireless local loop (WLL) station, or a personal digital assistant (PDA). The terminal device may also be referred to as a system, a subscriber unit, a subscriber station, a mobile station, a remote station, an access point, a remote terminal, an access terminal, a user agent, a user device or user equipment, a user station, a remote station, a terminal equipment (TE), a terminal, a wireless communication device, and a user agent or user apparatus. In addition, the terminal device may alternatively be a chip system configured to implement a function of user equipment (UE). This is not specifically limited herein.

In the communication system provided in this embodiment of this application, the terminal device may access the network device, and communicate with the network device. For example, one network device may manage one or more (for example, three or six) cells, and the terminal device may access the network device in at least one of the one or more cells, and communicate with the network device in a cell in which the terminal device is located. In embodiments of this application, "at least one" may be one, two, three, or more. This is not limited in embodiments of this application.

Based on the communication system described in FIG. 1, a random access method provided in embodiments of this application is described.

Figure 2:
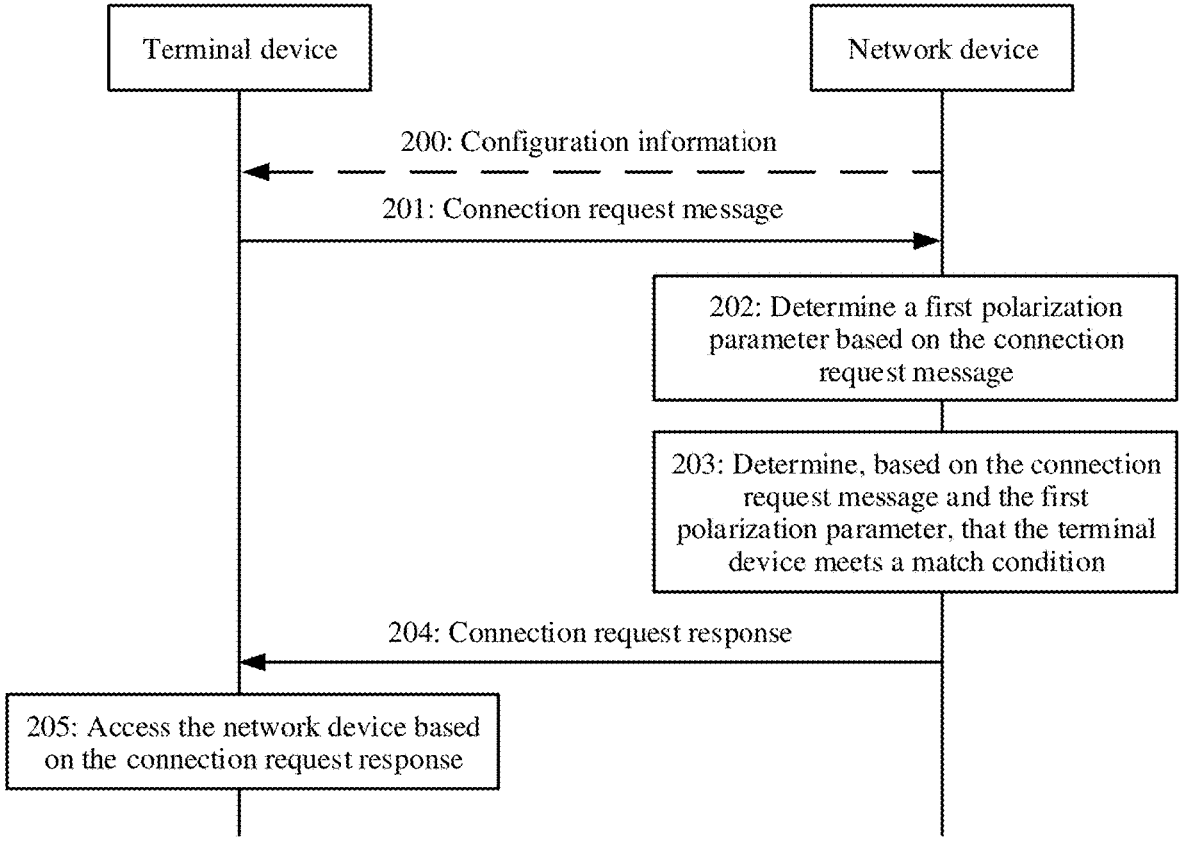
FIG. 2 is an example schematic diagram of an embodiment of a random access method according to an embodiment of this application.

Refer to FIG. 2. An embodiment of the random access method in embodiments of this application includes step 201 to step 205.

200: A network device sends configuration information to a terminal, and the terminal device receives the configuration information sent by the network device.

Optionally, before the terminal device sends a connection request message to the network device, the terminal device receives the configuration information sent by the network device.

The network device may send the configuration information by using radio resource control (RRC) signaling, or may send the configuration information by using any one of RRC reconfiguration signaling, media access control (MAC) control element (MAC CE) signaling, downlink control information (DCI), or uplink control information (UCI). This is not limited in this application.

201: The terminal device sends the connection request message to the network device, and the network device receives the connection request message sent by the terminal device.

In this embodiment of this application, the connection request message indicates the network device to establish a wireless connection to the terminal device.

For example, in a random access process, a first message may be a random access preamble message corresponding to the terminal device. Optionally, the network device may obtain a preamble ID based on the preamble message, where the preamble ID is a sequence ID of the preamble message. In the random access process, the preamble ID is used to request the network device to identify an identity of the terminal that sends the preamble message. Optionally, the network device may further obtain a downlink beam (Tx beam) based on the preamble message, and the network device may further obtain another parameter based on the preamble message. This is not specifically limited herein.

202: The network device determines a first polarization parameter based on the connection request message.

In this embodiment of this application, the first polarization parameter is a polarization parameter used when the terminal device sends the connection request message.

For example, the first polarization parameter may indicate a polarization mode used when the terminal device sends the connection request message. If the terminal device sends the connection request message in a circular polarization mode, the first polarization parameter may indicate a left-handed circular polarization mode or a right-handed circular polarization mode used when the terminal device sends the connection request message.

203: The network device determines, based on the connection request message and the first polarization parameter, whether the terminal device meets a match condition.

In this embodiment of this application, the network device may determine, based on the connection request message and the first polarization parameter, that the terminal device meets the match condition in a plurality of determining manners.

Optionally, the network device may determine whether a configuration form of the connection request message sent by the terminal device meets a requirement set by the network device. Optionally, the network device may determine whether a polarization parameter used when the terminal device sends the connection request message meets the requirement set by the network device. Optionally, the network device may further determine whether a signal strength of the connection request message received by the network device is greater than a preset threshold. Optionally, the network device may alternatively determine, in another manner, that the terminal device meets the match condition.

204: The network device sends a connection response to the terminal device, and the terminal device receives the connection response sent by the network device.

In this embodiment of this application, the connection response includes information about the first polarization parameter.

For example, in the random access process, the connection response may be a random access response (RAR). Optionally, the RAR may include the preamble ID, or the RAR message may include an RA-RNTI obtained based on the first polarization parameter, or the RAR may include another parameter. This is not specifically limited herein.

205: The terminal device accesses the network device based on the connection response.

In this embodiment of this application, after the terminal device receives the connection response, the terminal device may determine whether the terminal device is qualified to access the network device. Specifically, the terminal device determines, based on the information about the first polarization parameter included in the connection response, whether the terminal device is qualified to access the network. If the terminal device determines that the terminal device is qualified to access the network device, the terminal device may access the network device based on the connection response.

In this embodiment of this application, when accessing the network device based on the connection response, the terminal device may determine, based on the information about the first polarization parameter included in the connection response, whether the terminal device is qualified to access the network device. A dimension, namely, a polarization parameter is introduced, so that a preamble capacity is increased, and a problem that the network device cannot identify a colliding terminal device is alleviated.

In this embodiment of this application, in addition to step 201 to step 205, as shown in step 200, before the terminal device sends the connection request message to the network device, the terminal device may further receive the configuration information sent by the network device.

Optionally, the configuration information may indicate the terminal device to configure at least one of a sequence identity ID, a time-frequency resource, a space domain resource, and a polarization mode of the connection request message based on the configuration information. This is not specifically limited herein.

For example, the sequence ID may be the preamble ID. The connection request message sent by the terminal device includes a preamble. The terminal device may select, from a preamble resource pool based on the configuration information, a preamble indicated by a preamble ID that meets a requirement. In this way, the terminal device configures the sequence ID of the connection request message based on the configuration information.

For example, the time-frequency resource may include a time domain resource and a frequency domain resource. The terminal device may determine, based on the configuration information, to send the connection request message by using a type of time domain resource and/or frequency domain resource that meet a requirement. In this way, the terminal device configures the time-frequency resource of the connection request message by using the configuration information.

Optionally, the network device may indicate, by using the configuration information, that the connection request message sent by the terminal device to the network device is sent in a fixed polarization mode.

The network device may configure polarization modes in different ranges, for example, a satellite level, a cell level, a space domain or beam level, a time-frequency level, a preamble resource pool level, or a UE group level. For example, the network device may configure a polarization mode for each terminal device accessing a satellite, or configure a polarization mode for each terminal accessing a cell, or configure a polarization mode corresponding to a bandwidth part (BWP), or configure a polarization mode for an RACH occasion corresponding to a synchronization signal block, or configure a polarization mode for an RACH occasion. This is not limited in this application.

For example, a terminal device A receives configuration information sent by a network device B, and the configuration information may indicate the terminal device A to send a connection request message to the network device B in a left-handed circular polarization mode or a right-handed circular polarization mode.

For example, the terminal device A receives the configuration information sent by the network device B, and the configuration information may indicate the terminal device A to send the connection request message to the network device B in a polarization mode that is the same as or opposite to that of a received downlink signal.

Optionally, when the terminal device does not support a polarization mode indicated in the configuration information that is sent by the network device A and that is received by the terminal device, the terminal device may not send the connection request message to the network device A.

When the network device expects to receive the connection request message sent only in a fixed polarization mode, the network device may send the configuration information to the terminal device, where the configuration information includes the polarization mode expected by the network device. After receiving the configuration information, the terminal device sends an uplink signal on a corresponding polarization channel based on a requirement of the configuration information. Circular polarization is used as an example for description. The terminal device sends the connection request message to the network device only when a polarization mode supported by the terminal device is the same as a polarization mode expected by the network device.

There are terminal devices that support one polarization mode in a network. It is assumed that some terminal devices support only left-handed circular polarization, and some terminal devices support only right-handed circular polarization. In this case, RACH occasions may be grouped based on polarization modes by using polarization configuration solutions of different granularities in the foregoing embodiment.

For example, some RACH occasions (RO) accept only LHCP. The network notifies UE of the configuration information, and a terminal device that supports left-handed circular polarization sends a preamble on the RO. Some preamble configurations can be sent only in a left-handed circular polarization mode, and the network notifies the terminal device that supports left-handed circular polarization of the configuration information. The terminal device that supports left-handed circular polarization sends the preamble on the RACH occasion.

For example, the network device may alternatively deliver different synchronization signal blocks (SSBs) in different polarization modes. Because there is a specific mapping relationship between an SSB and an RO, a terminal device that receives a polarized SSB sends a preamble on an RO corresponding to the SSB by using a polarization mode corresponding to an SSB polarization mode. Without these configurations, the network device performs blind detection on a plurality of polarizations on all ROs, and complexity is high. If these configurations are introduced, the network device can avoid performing blind detection on different polarization channels.

There is a terminal device in a linear polarization state or in a non-obvious polarization state in the network, and there is also a terminal device that supports circular polarization. In this case, an uplink signal of the terminal device in the linear polarization state or in the non-obvious polarization state is simultaneously received by two polarization channels of the network device. Therefore, when the terminal device in the linear polarization state or in the non-obvious polarization state and the terminal device that supports circular polarization simultaneously send messages, the network device cannot perform signal detection in a polarization mode. However, because the terminal device may know a capability of the terminal device, the network device may group ROs, allocate some ROs to UE in the linear polarization state or in the non-obvious polarization state, and allocate some ROs to the terminal device that supports circular polarization. If the terminal device that supports circular polarization has both left-handed circular polarization and right-handed circular polarization, or a single terminal device can support flexible circular polarization sending, the method in the foregoing embodiment may still be used in the RO allocated to the terminal device that supports circular polarization. In this case, a granularity of a resource needs to be at least one RO level. To be specific, some ROs are configured for the terminal device in the linear polarization state or in the non-obvious polarization state, and the other ROs are configured for the terminal device that supports circular polarization. The terminal device may perform sending on a corresponding RO resource based on a capability of the terminal device and the configuration information of the network device.

For example, the terminal device may send the connection request message in a polarization mode specified in the configuration information. Optionally, the configuration information may specify that the terminal device sends the connection request message in the left-handed circular polarization mode. The configuration information may specify that the terminal device sends the connection request message in the right-handed circular polarization mode. The configuration information may further specify that the terminal device sends the connection request message in a form of randomly selecting a polarization mode, and the configuration information may further specify that the terminal device sends the connection request message in another polarization mode other than a circular polarization mode. This is not specifically limited herein.

For example, the configuration information may further indicate the terminal device to send the connection request message by using a specific downlink signal as a reference and in a polarization mode that is the same as or opposite to that of the downlink signal. In this way, the terminal device sends the connection request message in the polarization mode specified in the configuration information.

In this embodiment of this application, only the foregoing example is used as an example for description. The configuration information may alternatively use another form to indicate the terminal device to send the connection request message to the network device in a fixed polarization mode. This is not specifically limited herein.

In this embodiment of this application, the configuration information sent by the network device and received by the terminal device may include format information.

In a possible implementation, the format information may be preamble format information. The preamble format information may include a correspondence between a cyclic prefix length, a quantity of sequence repetitions, and a polarization mode. For example, the preamble format information may indicate that a preamble in a preamble format 1 is sent in the left-handed circular polarization mode, indicate that a preamble in a preamble format 2 is sent in the right-handed circular polarization mode, indicate that a preamble in a preamble 3 is sent in a randomly selected polarization mode, and indicate that a preamble in a preamble 4 is sent in a default polarization mode. Alternatively, a sending manner of the preamble may be indicated in another form. This is not specifically limited herein.

After the terminal device receives a PRACH configuration, the terminal device may select a preamble based on the PRACH configuration. The PRACH configuration further includes a correspondence between the preamble and a polarization mode, and the terminal device may send the preamble based on the polarization mode indicated in the correspondence.

Optionally, the network device may indicate, by using the configuration information, the terminal device to use a specific polarization mode when sending the connection request message by using a random resource (Random Occasion, RO).

The network device may configure different polarization transmission manners for different ROs by using the configuration information. For example, the configuration information may indicate a correspondence between an RO and a polarization mode, and ROs mapped to a same synchronization signal block (SSB) may be set to correspond to a same polarization mode. The configuration information may indicate to send the connection request message on an RO in the left-handed circular polarization mode, the right-handed circular polarization mode, the randomly selected polarization mode, or the default polarization mode. When the terminal device sends the connection request message through an RO, the terminal device may select, based on the configuration information, a polarization mode corresponding to the RO to send the connection request message.

In this embodiment of this application, in some non-contention access scenarios, for example, a satellite switching scenario, a cell switching scenario, a beam switching scenario, a paging scenario, and a scenario in which a terminal device requests a system information (SI), a network device needs to send an expected polarization mode to a terminal device when configuring the terminal device to use a preamble, and the network device performs signal detection based on the configured polarization mode. In a switching scenario (including satellite, cell, and beam switching), a network device configures an expected uplink signal transmit port status of a target satellite, cell, or beam for a terminal device by using a current satellite, cell, or beam.

For example, the configuration information sent by the network device may further include a mapping relationship between SI, a polarization mode, and a preamble. After the terminal device receives the configuration information, the terminal device may select, based on a service requirement, expected SI, and select, based on the SI, a preamble corresponding to the SI and a polarization mode corresponding to the SI. After the terminal device sends the preamble to the network device in the selected polarization mode, the network device may select the corresponding SI based on the preamble and the polarization mode, and return a response to the terminal device.

The solutions in embodiments of this application are further applicable to an RACH-free (RACH-less) manner. RACH-less is a special access mode. In switching scenarios such as a satellite switching scenario, a cell switching scenario, and a beam switching scenario, a terminal device sends a connection request message to a network device through a random access channel (RACH), to obtain timing advance (TA) of a target cell and initial uplink grant of a target network device that needs to be accessed after switching. If the terminal device may obtain related information of the target network device in advance by using a source network device or by using another mechanism, after the terminal device receives configuration information sent by the target network device, the terminal device may configure a related parameter of an access request message based on the configuration information. The access request message may not be a preamble. The terminal device sends the access request message to the network device. After the network device receives the access request message, the network device establishes a communication connection to the terminal device. Compared with a contention access process, a msg1 and a msg2 are omitted, and the network device directly sends the access request message (a msg3). Although a zero interruption delay cannot be achieved by using this mechanism, a switching interruption delay can be reduced to some extent. The configuration information sent by the network device to the terminal device may be an RRC configuration update complete (RRC Connection Reconfiguration Complete) message, and the RRC Connection Reconfiguration Complete message may include uplink grant (UL grant). When the target network device does not have a RACH process, the target network device also needs to assign the UL grant. Optionally, pre-allocated UL grant may be carried in a switching command delivered by the source network device, and the pre-allocated UL grant may remain valid for a period of time. Optionally, the target network device may alternatively assign the UL grant in a dynamic scheduling manner, and the target network device assigns the UL grant to the terminal device in a time that can be scheduled by the terminal device through dynamic scheduling. For the former case, the source network device needs to notify the terminal device of a polarization mode used when the target network device expects the terminal device to send the connection request message (msg3). Configuration information about the polarization mode may be carried in RRC Connection Reconfiguration, or may be carried in the UL Grant. For the latter case, related configuration information is configured in the UL Grant.

In this embodiment of this application, the configuration information sent by the network device and received by the terminal device may include index information.

In a possible implementation, the index information may be a PRACH configuration index (PRACH configuration index).

Optionally, the terminal device may configure, based on the PRACH configuration index, a time-frequency resource used when the terminal device sends the preamble.

Optionally, the terminal device may configure, based on the PRACH configuration index, a polarization mode used when the terminal device sends the preamble. The PRACH configuration index may include a polarization parameter, and the PRACH configuration index may indicate the terminal device to send the connection request message in the left-handed circular polarization mode, the right-handed circular polarization mode, the randomly selected manner, or the default polarization mode. The PRACH configuration index may further indicate the terminal device to send the connection request message in another polarization mode. This is not specifically limited herein.

Optionally, the terminal device may further configure, based on the PRACH configuration index, another related parameter used when the terminal device sends the preamble. This is not specifically limited herein.

In this embodiment of this application, after receiving the configuration information sent by the network device, the terminal device sends the connection request message based on the polarization mode specified in the configuration information, to implement some specific detection effects.

The network device configures the terminal device to send different preamble combinations on different polarizations. The configuration information sent by the network device includes a combination rule and an available range of preambles transmitted by the terminal device on two polarization ports. The combination rule and the available range are agreed upon by the network device and the terminal device. After the network device receives the different preamble combinations sent by the terminal device on the different polarizations based on the configuration information, the network device may obtain specific effect by using a specific algorithm.

In a possible implementation, the network device detects a ZC preamble with a large frequency offset by using the foregoing polarization reuse method. Specifically, the terminal device sends, to the network device on different polarization ports, preambles having different ZC root sequence indexes. Other parameters included in these preambles, such as subcarrier widths, ZC lengths, quantities of repetitions, and CP lengths, are the same. When receiving, on different polarizations, information sent by the terminal device, the network device may obtain, based on different peak shifts of received signals on two polarizations, a frequency offset status of a signal sent by the terminal device. For details, refer to the patent 201910945929.4. It should be noted that preambles sent on the different polarization channels may use a same time-frequency location, or may use different time-frequency locations. If the preambles sent on the different polarization channels use the different time-frequency locations, the network device and the terminal device need to agree on a difference between the time-frequency locations of the preambles on the different polarization channels, to facilitate detection by using a detection algorithm.

In this embodiment of this application, that a same terminal device transmits different preamble combinations on different polarizations can implement some specific implicit information transfer.

In a possible implementation, that the terminal device sends a preamble on a polarization channel may indicate that the terminal device supports transmission on the polarization channel, and implicitly notify the network device that the terminal device expects to obtain downlink information on the polarization channel.

The network device and the terminal device may agree on a preamble combination rule used when the terminal device transmits preambles on two different polarization ports, and different preamble combination rules may implicitly transfer different meanings. The network device and the terminal device may agree on a correspondence between a preamble combination rule and an implicit meaning. The configuration information sent by the network device to the terminal device may include the preamble combination rule and the correspondence between the preamble combination rule and the implicit meaning, so that the network device and the terminal device transfer some specific implicit information by using different preamble combinations.

In this embodiment of this application, when sending the preamble, the terminal device may carry more information through polarization reuse.

The terminal device sends different preambles on different polarizations. For example, it is assumed that there are x optional preambles in total. In this case, for each selected preamble, there are y optional preambles on another polarization channel, which is equivalent to that the another polarization channel can be used to transmit log 2(y) bit information. The log 2(y) bit information may indicate some additional information.

For example, that the terminal device transmits different preamble combinations on different polarizations may be used to describe a feature of data sent together with the preambles. In a grant-free/2 step random access (Grant-free/2 step RACH) scenario, the log 2(x) bit may indicate a modulation and coding scheme (MCS) for the data sent together with the preambles. This can improve data transmission flexibility in a corresponding scenario, better adapt to a channel environment, and maximize a transmission capacity.

For example, that the terminal device transmits different preamble combinations on different polarizations indicates a capability of the terminal device. For example, that the terminal device transmits different preamble combinations on different polarizations may indicate a transmit power or residual power of the terminal, and/or a type or the capability of the terminal device.

Optionally, that the terminal device transmits different preamble combinations on different polarizations may indicate whether the terminal device supports a global navigation satellite system (GNSS). That the terminal device transmits different preamble combinations on different polarizations may indicate whether the terminal device has a polarization capability of a multi-polarized transmit signal, or may indicate quality of a signal received by the terminal device, or may indicate other information. This is not specifically limited herein.

Optionally, the terminal device may notify, by transmitting different preamble combinations on different polarizations, the network device whether the terminal device supports the GNSS. In this way, some signaling overheads subsequently used to serve a non-GNSS user can be reduced.

Optionally, the terminal device may notify, by transmitting different preamble combinations on different polarizations, the network device whether the terminal device supports polarization reuse transmission and a supported polarization transmission capability. In this way, the network device can know whether scheduling in a polarization reuse form can be performed for the terminal device. After the terminal device notifies the network device of a transmit power of the terminal device, the network device adjusts, based on a received signal strength, the transmit power used when the terminal device sends the connection request message, to optimize an interference level of the entire system.

In a possible implementation, the terminal device may indicate, by using a combination of a preamble and a polarization mode, to apply for a system information.

Optionally, that the terminal device transmits different preamble combinations on different polarizations may be used to apply for different information.

For example, in an existing system implementation, the terminal device may apply to the network device for obtaining a type of information, for example, a system information (SI). The network device first configures a mapping relationship between different preambles and different types of system information. The mapping relationship is included in the configuration information sent by the network device to the terminal device. The terminal device determines, based on the mapping relationship included in the configuration information and a system information that needs to be applied for by the terminal device, a preamble to be sent. The terminal device determines, based on the detected preamble and the mapping relationship, to send a corresponding system information to UE.

In this embodiment of this application, after a dimension, namely, polarization is introduced into the random access process, the dimension, namely, the polarization, may be introduced into a corresponding mapping configuration. To be specific, sending a same preamble on different polarization channels may indicate that different SI is applied for, or sending different preamble combinations on different polarization channels may indicate that different SI is applied for.

In this embodiment of this application, there is a specific implementation in which the terminal device accesses the network device based on the connection response in step 205. The specific implementation is described in the following embodiment.

The terminal device determines, based on the connection response, whether the terminal device meets the match condition.

Figure 3:
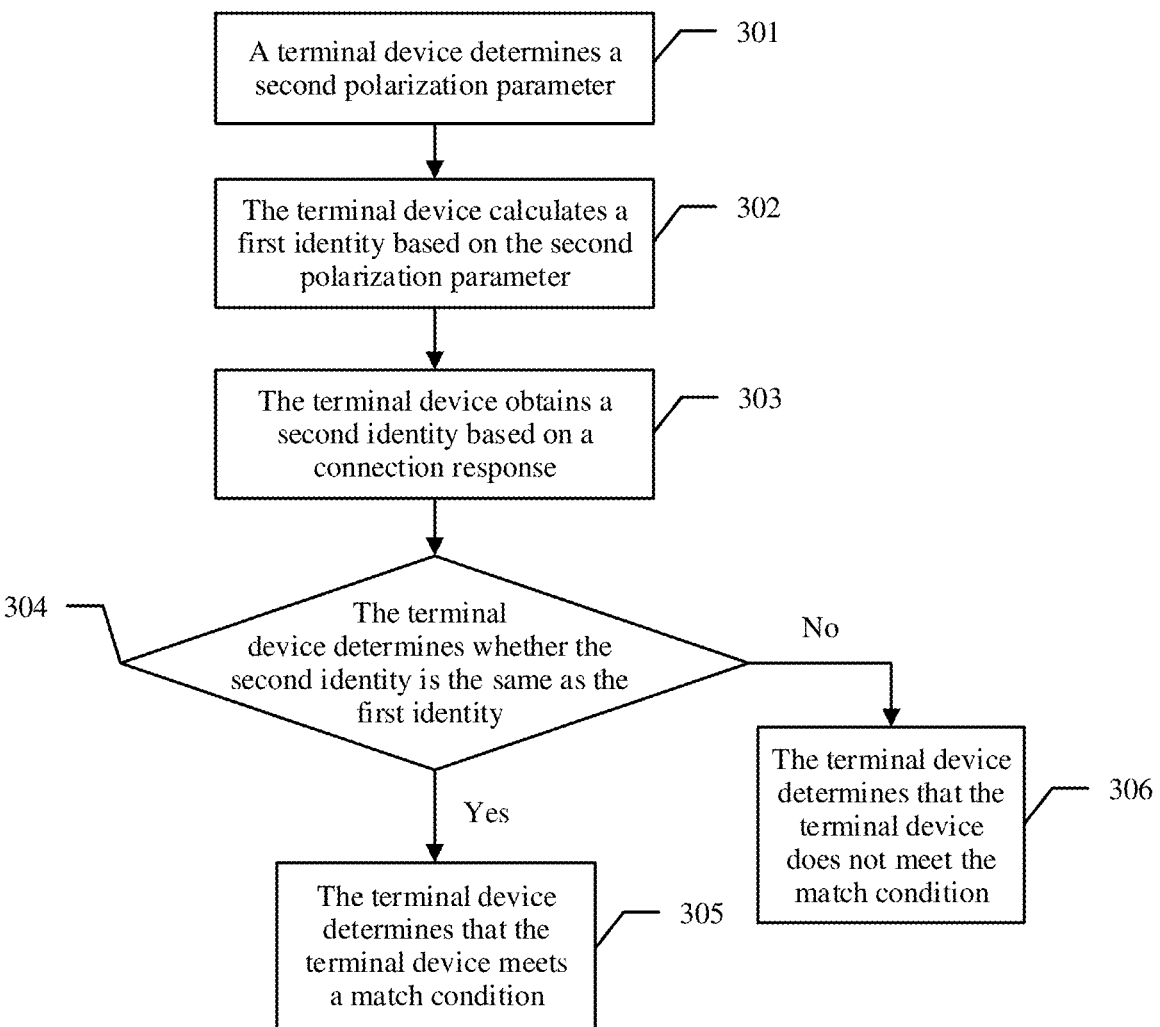
FIG. 3 is an example schematic diagram of another embodiment of a random access method according to an embodiment of this application.

FIG. 3 is a schematic diagram of an embodiment of a random access method according to an embodiment of this application.

Refer to FIG. 3. Optionally, a terminal device may determine, based on a first identity and a second identity, whether the terminal device meets a match condition.

301: The terminal device determines a second polarization parameter.

In this embodiment of this application, the second polarization parameter is a polarization parameter used when the terminal device sends a first message. For example, if the terminal device sends the connection request message in a left-handed circular polarization mode, the second polarization parameter is a polarization parameter corresponding to the left-handed circular polarization mode. If the terminal device sends the connection request message in a right-handed circular polarization mode, the second polarization parameter is a polarization parameter corresponding to the right-handed circular polarization mode. This is not specifically limited herein.

302: The terminal device obtains the first identity based on the second polarization parameter.

In this embodiment of this application, the first identity indicates the terminal device to determine, based on the first identity, whether the terminal device meets the match condition.

For example, the first identity may be a first RA-RNTI, and the terminal device may obtain the first RA-RNTI based on the second polarization parameter and another related parameter.

For example, a formula for obtaining the first RA-RNTI may be expressed in the following form:

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times polarization\_id$$

s_id: start symbol index (0<=s_id<14) of a PRACH;

t_id: start slot index (0<=t_id<80) of a PRACH in a system frame;

f_id: PRACH position index in frequency domain (0<=s_id<8);

ul_carrier_id: uplink carrier (0=normal carrier, 1=SUL carrier) for sending the connection request message; and polarization_id: polarization parameter (0=RHCP, 1=LHCP) for sending the connection request message.

In the obtaining formula provided in this embodiment of this application, each parameter may be equivalent to one bit. Optionally, the polarization parameter may be considered as a most significant bit, or the polarization parameter may be considered as a middle bit or a least significant bit. When the polarization parameter is considered as the most significant bit, impact on an existing protocol is small.

Optionally, a manner of obtaining the first RA-RNTI in this embodiment of this application is described by using the foregoing formula as an example. The first RA-RNTI may alternatively be obtained by using another formula. This is not specifically limited herein.

303: The terminal device obtains the second identity based on a connection response.

For example, in a random access process, the connection response may be an RAR message. Optionally, the RAR message may include a preamble ID, and in the RAR message, the second identity obtained from a first polarization parameter may be further transmitted in an invisible manner by scrambling a CRC of control information for scheduling the RAR message. The second identity may be a second RA-RNTI, and the RAR message may further include another parameter. This is not specifically limited herein.

It should be noted that the second RA-RNTI may be obtained by using the foregoing formula for obtaining the first RA-RNTI, or may be obtained by using another formula. This is not limited herein.

304: The terminal device determines whether the second identity is the same as the first identity.

For example, the first identity may be a first RA-RNTI, and the second identity may be a second RA-RNTI. In this embodiment of this application, the terminal device may determine, by determining whether the second RA-RNTI is the same as the first RA-RNTI, whether the terminal device meets the match condition.

305: If the second identity is the same as the first identity, the terminal device determines that the terminal device meets the match condition.

306: If the second identity is different from the first identity, the terminal device determines that the terminal device does not meet the match condition.

Optionally, the connection response may include a parameter field of the first polarization parameter. The parameter field of the first polarization parameter is used to determine whether the terminal device meets the match condition. The terminal device may determine, based on the parameter field of the first polarization parameter and a parameter field of the second polarization parameter, whether the terminal device meets the match condition.

Figure 4:
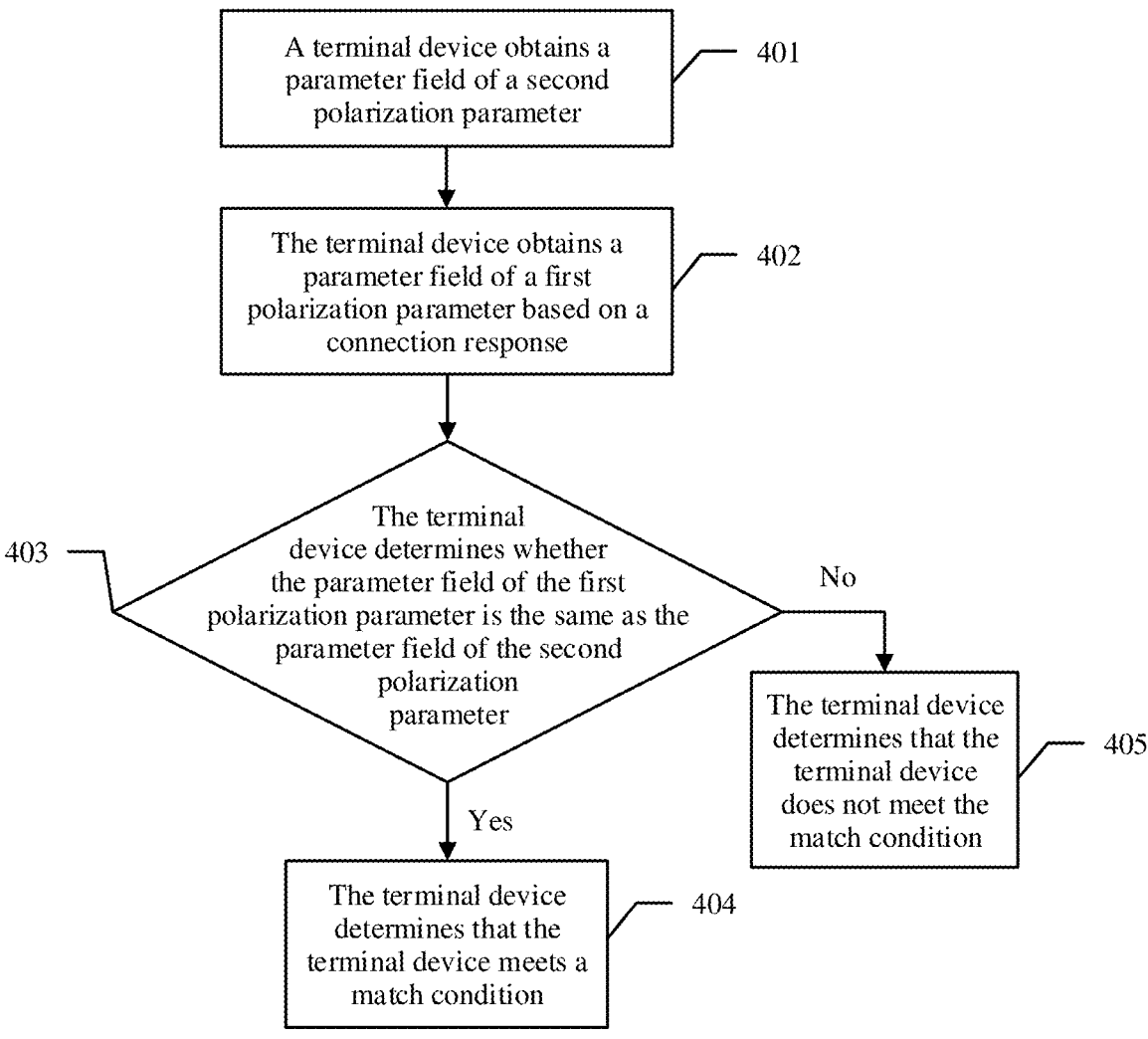
FIG. 4 is an example schematic diagram of another embodiment of a random access method according to an embodiment of this application.

FIG. 4 is a schematic diagram of an embodiment of a random access method according to an embodiment of this application.

Refer to FIG. 4. Optionally, a terminal device may determine, based on a parameter field of a first polarization parameter and a parameter field of a second polarization parameter, whether the terminal device meets a match condition.

401: The terminal device obtains the parameter field of the second polarization parameter.

The second polarization parameter is a polarization parameter used when the terminal device sends a first message. The terminal device may obtain the parameter field of the second polarization parameter based on the second polarization parameter.

402: The terminal device obtains the parameter field of the first polarization parameter based on a connection response.

In this embodiment of this application, the connection response may include the parameter field of the first polarization parameter.

For example, when the connection response is an RAR message, the RAR message may include the parameter field of the first polarization parameter.

Optionally, the RAR message may include a preamble ID, and one or more additional bits may be introduced into the preamble ID to indicate the parameter field of the first polarization parameter. Optionally, one or more bits may be separately introduced into the RAR message to indicate the parameter field of the first polarization parameter. Optionally, the RAR message may alternatively indicate the parameter field of the first polarization parameter in another form. This is not specifically limited herein.

403: The terminal device determines whether the parameter field of the first polarization parameter is the same as the parameter field of the second polarization parameter.

In this embodiment of this application, the terminal device may determine, by determining whether the parameter field of the first polarization parameter is the same as the parameter field of the second polarization parameter, whether the terminal device meets the match condition.

404: If the parameter field of the first polarization parameter is the same as the parameter field of the second polarization parameter, the terminal device determines that the terminal device meets the match condition.

405: If the parameter field of the first polarization parameter is different from the parameter field of the second polarization parameter, the terminal device determines that the terminal device does not meet the match condition.

In this embodiment of this application, that the terminal device determines, based on the connection response, whether the terminal device meets the match condition is described by using the embodiment shown in step 301 to step 306 and the embodiment shown in step 401 to step 405 as examples. The terminal device may alternatively determine, based on the connection response in another manner, whether the terminal device meets the match condition. This is not specifically limited herein.

If the terminal device meets the match condition, the terminal device accesses a network device.

Optionally, based on the random access method provided in the foregoing embodiment, the terminal device provided in this embodiment of this application may randomly access the network device in two manners: a non-contention-based random access manner and a contention-based random access manner.

In the non-contention-based random access manner, after the terminal device receives configuration information sent by the network device, the terminal device sends a connection request message to the network device. After the network device determines the first polarization parameter based on the connection request message, the network device determines, based on the connection request message and the first polarization parameter, that the terminal device meets the match condition, and the network device sends the connection response to the terminal device. In this way, the terminal device accesses the network device based on the connection response.

In the contention-based random access manner, in a process in which the terminal device accesses the network device based on the connection response, after the terminal device determines that the terminal device meets the match condition, the terminal device sends a contention verification message to the network device. After the network device determines that the terminal device meets a contention condition, the network device sends a response to the terminal device. The terminal device accesses the network device based on the response.

In this embodiment of this application, in addition to a random access process, polarization configuration may alternatively be performed for sending another uplink signal. For example, polarization configuration may be performed on a sounding reference signal (SRS), a scheduling request (SR), an uplink data signal, and the like. The network device may send the configuration information to the terminal device, where the configuration information may indicate that a corresponding uplink signal is sent in a polarization mode. The terminal device may perform sending on a time/frequency/space resource based on the configuration information by using the polarization mode indicated by the configuration information.

In an actual protocol, the polarization mode may be described by using a left-handed circular polarization LHCP or right-handed circular polarization RHCP; or the polarization mode may be described by using a port 0 or a port 1 in a pre-agreed manner; or a port used to transmit a signal may be implicitly described by using some manners used to represent whether the port is the same as a reference port. For example, the port 0 indicates that a port used for sending a message is the same as a receiving port used for a downlink signal, and the port 1 indicates that the port used for sending the message is opposite to the receiving port used for the downlink signal. In a switching scenario, the reference port may be a port used by a current cell to receive/send a message, and indicating 0 or 1 in the configuration information indicates that the reference port is the same as or different from the port used by the current cell.

For example, as shown in FIG. 4*a*, the network device may configure, by using RRC signaling, a polarization mode for SR sending, and the network device may configure the polarization mode for the SR sending by adding a field shown in a block in FIG. 4*a* to the RRC signaling.

For example, as shown in FIG. 4*b*, the network device may configure, by using RRC signaling, a polarization mode for SRS sending, and the network device may configure the polarization mode for the SRS sending by adding a field shown in a block in FIG. 4*b* to the RRC signaling. It should be noted that in addition to the RRC signaling, the network device may further configure the polarization mode by using any one of the following signaling: RRC reconfiguration signaling, a MAC CE, DCI, and UCI. This is not limited in this application.

For a communication system, in addition to initial configuration, a network device may update, as required, related polarization configuration information used for access signaling, SR signaling, SRS signaling, and a data transmission message.

Optionally, a granularity of polarization configuration update is an entire satellite level. When the granularity of the polarization configuration update is the entire satellite level, a polarization configuration is generally transmitted in SI by using the RRC signaling. When one satellite exchanges data with a plurality of cells, the SI further indicates which polarization configurations are applicable to which specific cells.

Optionally, the granularity of the polarization configuration update may alternatively be a cell level. When the granularity of the polarization configuration update is the cell level, the polarization configuration is generally transmitted by using the RRC signaling.

Optionally, the granularity of the polarization configuration update may alternatively be a beam level. When the granularity of the polarization configuration update is the beam level, the polarization configuration may be generally transmitted by using the RRC signaling and the media access control control element (MAC CE) signaling.

Optionally, the granularity of the polarization configuration update may alternatively be a terminal device group level. When the granularity of the polarization configuration update is the terminal device group level, the polarization configuration may be generally transmitted by using the MAC CE signaling and group downlink control information (group DCI) signaling.

Optionally, the granularity of the polarization configuration update may alternatively be a terminal device level. When the granularity of the polarization configuration update is the terminal device level, the polarization configuration may be generally transmitted by using the MAC CE signaling and the DCI signaling.

Optionally, the granularity of the polarization configuration update may alternatively be another level, and the polarization configuration may alternatively be transmitted by using other signaling. This is not specifically limited herein.

For an existing LTE or NR system, a carrier of a satellite beam in a protocol may be a BWP, a transmission configuration indicator (TCI), a channel state information reference signal (CSI-RS) port, a CSI-RS port group, or the like. Different levels of update and notification manners enable the system to have sufficient flexibility to perform sufficient configuration at various hardware levels, and can reduce signaling overheads. For example, when a hardware capability of a network device of an entire satellite is insufficient to support polarization reuse, a terminal device only needs to be notified, by using a system information, that all signals use one polarization status.

Correspondingly, the terminal device may also update a polarization capability of the terminal device to the network device based on a status of the terminal device. An update manner may be as described in the foregoing embodiment. The network device is notified of the polarization capability state of the terminal device by transmitting a preamble with a specific configuration such as a specific preamble and a specific transmit polarization combination, or by sending different preamble combinations on different polarization channels. The network device may alternatively be notified by using other signaling, for example, the uplink control information (UCI). This is not specifically limited herein.

The terminal device sends the first message used to establish a wireless connection to the network device. The terminal device receives the connection response sent by the network device, where the connection response includes information about the first polarization parameter. When accessing the network device based on the connection response, the terminal device determines, based on the information about the first polarization parameter included in the connection response, whether the terminal device is qualified to access the network device. A dimension, namely, a polarization parameter, is introduced into a random access procedure, so that a preamble capacity is increased, and a problem that the network device cannot identify a colliding terminal device is alleviated.

In this embodiment of this application, after the terminal device sends the first message to the network device, the terminal device may receive the connection response sent by the network device. The connection response includes the information about the first polarization parameter. The terminal device accesses the network device based on the connection response. When accessing the network device based on the connection response, the terminal device may determine, based on the information about the first polarization parameter included in the connection response, whether the terminal device is qualified to access the network device. A new verification manner is introduced. In this embodiment of this application, accuracy of determining, by the terminal device, whether the terminal device meets the match condition is improved.

Figure 5:
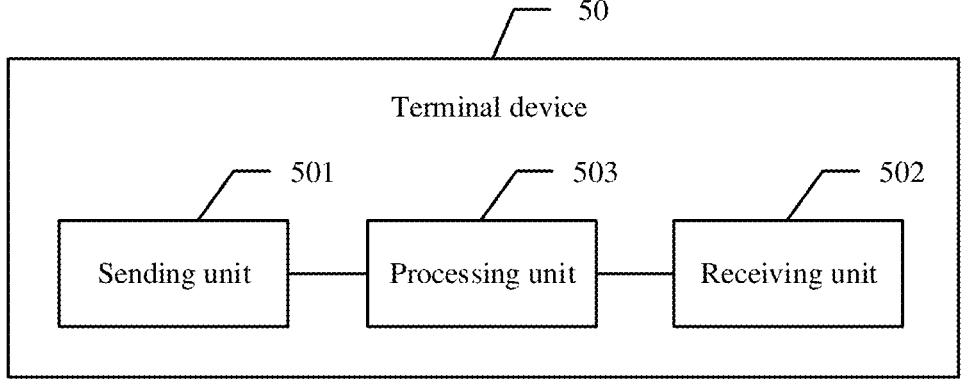
FIG. 5 is an example schematic diagram of a structure of a terminal device according to an embodiment of this application.

The foregoing embodiment provides different implementations of the random access method. The following provides a terminal device 50. As shown in FIG. 5, the terminal device 50 is configured to perform the steps performed by the terminal device in the foregoing embodiments. For details about the execution steps and corresponding beneficial effects, refer to the foregoing corresponding embodiments for understanding. The terminal device 50 includes:

a sending unit 501, configured to send a first message to a network device, where the first message is used to request the network device to establish a wireless connection to the terminal device;

a receiving unit 502, configured to receive a connection response sent by the network device, where the connection response includes information about a first polarization parameter; and a processing unit 503, configured to access the network device based on the connection response.

In a specific implementation, the receiving unit 502 is further configured to receive configuration information sent by the network device, where the configuration information indicates the terminal device to configure at least one of a sequence identity ID, a time-frequency resource, a space domain resource, and a polarization mode of the first message based on the configuration information.

In a specific implementation, the configuration information includes index information, and the index information indicates the terminal device to configure at least one of the sequence ID, the time-frequency resource, the space domain resource, and the polarization mode of the first message based on the index information.

In a specific implementation, the processing unit 503 is configured to: determine, based on the connection response, whether the terminal device meets a match condition; and indicate the terminal device to access the network device if the terminal meets the match condition.

In a specific implementation, the processing unit 503 is further configured to:

determine a second polarization parameter, where the second polarization parameter is a polarization parameter used when the terminal device sends the first message; and obtain a first identity based on the second polarization parameter, where the first identity indicates the terminal device to determine, based on the first identity, whether the terminal device meets the match condition.

In a specific implementation, the connection response includes a second identity, the second identity is related to the first polarization parameter, and the second identity indicates the terminal device to determine, based on the second identity, whether the terminal device meets the match condition; and the processing unit 503 is further configured to:

obtain the second identity based on the connection response;

determine whether the second identity is the same as the first identity; and if the second identity is the same as the first identity, determine that the terminal device meets the match condition.

In a specific implementation, the first identity is a first access radio network temporary identifier RA-RNTI, and the second identity is a second RA-RNTI.

In a specific implementation, the connection response includes a parameter field of the first polarization parameter, and the parameter field of the first polarization parameter is used to determine whether the terminal device meets the match condition; and the processing unit 503 is further configured to:

obtain a parameter field of the second polarization parameter;

obtain the parameter field of the first polarization parameter based on the connection response;

determine whether the parameter field of the first polarization parameter is the same as the parameter field of the second polarization parameter; and if the parameter field of the first polarization parameter is the same as the parameter field of the second polarization parameter, determine that the terminal device meets the match condition.

It should be noted that content such as information exchange between the modules of the terminal device 50 and the execution processes thereof is based on a same concept as the method embodiments of this application, and achieves same technical effects as the method embodiments of the present technology. For specific content, refer to the foregoing descriptions in the method embodiments of this application.

Figure 6:
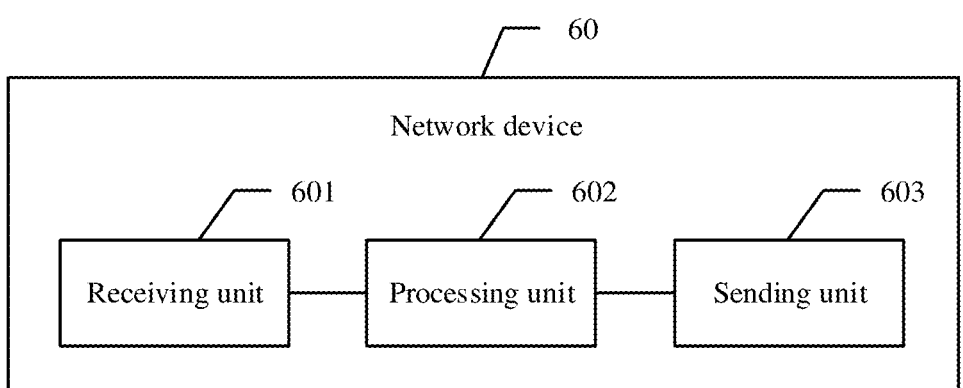
FIG. 6 is an example schematic diagram of a structure of a network device according to an embodiment of this application.

The foregoing embodiment provides different implementations of the terminal device 50. The following provides a network device 60. As shown in FIG. 6, the network device 60 is configured to perform the steps performed by the network device in the foregoing embodiments. For details about the execution steps and corresponding beneficial effects, refer to the foregoing corresponding embodiments for understanding. The network device 60 includes:

a receiving unit 601, configured to receive a second message sent by a terminal device, where the second message is used to request the network device to establish a wireless connection to the terminal device;

a processing unit 602, configured to:

determine a first polarization parameter based on the second message, where the first polarization parameter is a polarization parameter used when the terminal device sends the second message; and determine, based on the second message and the first polarization parameter, whether the terminal device meets a match condition; and a sending unit 603, configured to send a connection response to the terminal device if the terminal device meets the match condition, where the connection response includes information about the first polarization parameter, and the connection response indicates the terminal device to access the network device.

In a specific implementation, the sending unit 603 is further configured to send configuration information to the terminal device, where the configuration information indicates the terminal device to configure at least one of a sequence ID, a time-frequency resource, a space domain resource, and a polarization mode of the second message based on the configuration information.

In a specific implementation, the configuration information includes index information, and the index information indicates the terminal device to configure at least one of the sequence ID, the time-frequency resource, the space domain resource, and the polarization mode of the first message based on the index information.

In a specific implementation, the connection response includes a second identity; and the processing unit 602 is further configured to: obtain the second identity based on the first polarization parameter, where the second identity indicates the terminal device to determine, based on the second identity, whether the terminal device meets the match condition.

In a specific implementation, the second identity is a second RA-RNTI.

In a specific implementation, the connection response includes a parameter field of the first polarization parameter, and the parameter field of the first polarization parameter indicates the terminal device to determine, based on the parameter field of the first polarization parameter, whether the terminal device meets the match condition.

It should be noted that content such as information exchange between the modules of the network device 60 and the execution processes thereof is based on a same concept as the method embodiments of this application, and achieves same technical effects as the method embodiments of the present technology. For specific content, refer to the foregoing descriptions in the method embodiments of this application.

Figure 7:
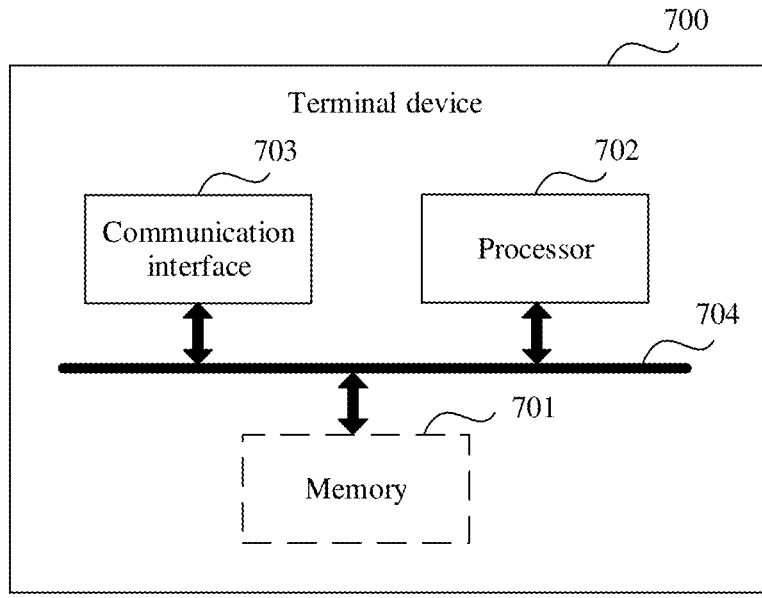
FIG. 7 is an example schematic diagram of another structure of a terminal device according to an embodiment of this application.

FIG. 7 is a schematic diagram of a structure of a terminal device 700 according to an embodiment of this application. The terminal device 700 includes a processor 702, a communication interface 703, a memory 701, and a bus 704. The processor 702 and the memory 701 are coupled to each other. In this embodiment, the communication interface 703, the processor 702, and the memory 701 are connected to each other through the bus 704. The bus 704 may be a peripheral component interconnect (PCI) bus, an extended industry standard architecture (EISA) bus, or the like. The bus may be classified into an address bus, a data bus, a control bus, and the like. For ease of representation, only one bold line is used for representation in FIG. 7, but this does not mean that there is only one bus or only one type of bus. The terminal device 700 may implement functions of the terminal device in the embodiment shown in FIG. 5. The processor 702 and the communication interface 703 may perform corresponding functions of the terminal device in the foregoing method examples. The processor 702 may implement a function implemented by the processing unit 503 in the terminal device 50, and the communication interface 703 may implement a function implemented by the sending unit 501 and/or the receiving unit 502 in the terminal device 50.

The communication interface 703 is configured to communicate with another user equipment.

In an example, the communication interface 703 is configured to send a first message to a network device.

In an example, the communication interface 703 is configured to receive a connection response sent by the network device.

In an example, the communication interface 703 is configured to receive configuration information sent by the network device.

The processor 702 may perform the operations performed by the terminal device in the embodiment shown in FIG. 5.

In a possible implementation, the processor 702 runs or executes a software program and/or a module stored in the memory 701, and invokes data stored in the memory 701, to perform the following functions:

When the processor accesses the network device based on the connection response, the processor may determine, based on information about a first polarization parameter included in the connection response, whether the terminal device is qualified to access the network device. A new verification manner is introduced. In this embodiment of this application, accuracy of determining, by the processor, whether the terminal device meets a match condition is improved.

It should be noted that content such as information exchange between the modules of the terminal device 700 and the execution processes thereof is based on a same concept as the method embodiments of this application, and achieves same technical effects as the method embodiments of the present technology. For specific content, refer to the foregoing descriptions in the method embodiments of this application.

Figure 8:
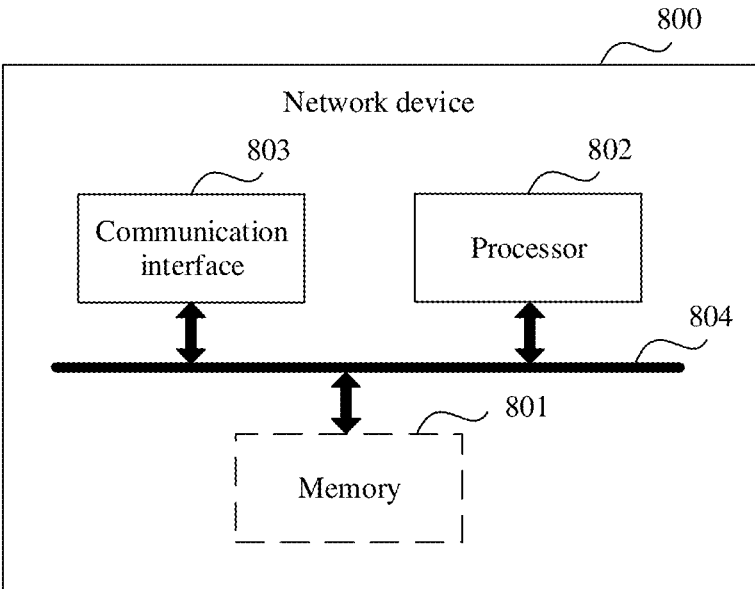
FIG. 8 is an example schematic diagram of another structure of a network device according to an embodiment of this application.

FIG. 8 is a schematic diagram of a structure of a network device 800 according to an embodiment of this application. The network device 800 includes a processor 802, a communication interface 803, a memory 801, and a bus 804. The processor 802 and the memory 801 are coupled to each other. In this embodiment, the communication interface 803, the processor 802, and the memory 801 are connected to each other through the bus 804. The bus 804 may be a PCI bus, an EISA bus, or the like. The bus may be classified into an address bus, a data bus, a control bus, and the like. For ease of representation, only one bold line is used for representation in FIG. 8, but this does not mean that there is only one bus or only one type of bus. The network device 800 may implement functions of the network device in the embodiment shown in FIG. 6. The processor 802 and the communication interface 803 may perform corresponding functions of the network device in the foregoing method examples. The processor 802 may further implement a function implemented by the processing unit 602 in the network device 60, and the communication interface 803 may implement a function implemented by the receiving unit 601 and/or the sending unit 603 in the terminal device 60.

The communication interface 803 is configured to communicate with another user equipment.

In an example, the communication interface 803 is configured to receive a second message sent by a terminal device.

In an example, the communication interface 803 is configured to send a connection response to the terminal device.

In an example, the communication interface 803 is configured to send configuration information to the terminal device.

The processor 802 may perform the operations performed by the network device in the embodiment shown in FIG. 6.

In a possible implementation, the processor 802 runs or executes a software program and/or a module stored in the memory 801, and invokes data stored in the memory 801, to perform the following functions:

After the processor receives the second message sent by the terminal device, the processor determines a first polarization parameter based on the second message. In this way, the processor may determine, based on the second message and the first polarization parameter, whether the terminal device meets a match condition. If the terminal device meets the match condition, the processor sends the connection response to the terminal device. The processor may determine, based on the first polarization parameter, whether the terminal device is qualified to access the network device. A new verification manner is introduced. In this embodiment of this application, accuracy of determining, by the network device, whether the terminal device meets the match condition is improved.

It should be noted that content such as information exchange between the modules of the network device 800 and the execution processes thereof is based on a same concept as the method embodiments of this application, and achieves same technical effects as the method embodiments of the present technology. For specific content, refer to the foregoing descriptions in the method embodiments of this application.

The following describes each component of the terminal device and the network device in detail with reference to FIG. 7 and FIG. 8.

Each of the memory 701 and the memory 801 in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example, and not limitation, the RAM may include a plurality of forms in the following: a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory ESDRAM), a synchlink dynamic random access memory (SLDRAM), and a direct rambus random access memory (DR RAM). Optionally, the memory may be integrated into the terminal device or the network device, or the memory may not be integrated into the terminal device or the network device. The memory may be provided externally. This is not specifically limited herein.

Each of the processor 702 and the processor 802 is a control center of a controller, and may be a central processing unit (CPU), or may be an application-specific integrated circuit (ASIC), or one or more integrated circuits configured to implement embodiments of this application, for example, one or more digital signal processors (DSPs), or one or more field programmable gate arrays (FPGAs).

In a possible implementation, the memory 701 may be integrated into the processor 702, and the memory 801 may be integrated into the processor 802. In a possible implementation, the memory 701 and the processor 702 are disposed separately, and the memory 801 and the processor 802 are disposed separately.

Figure 9:
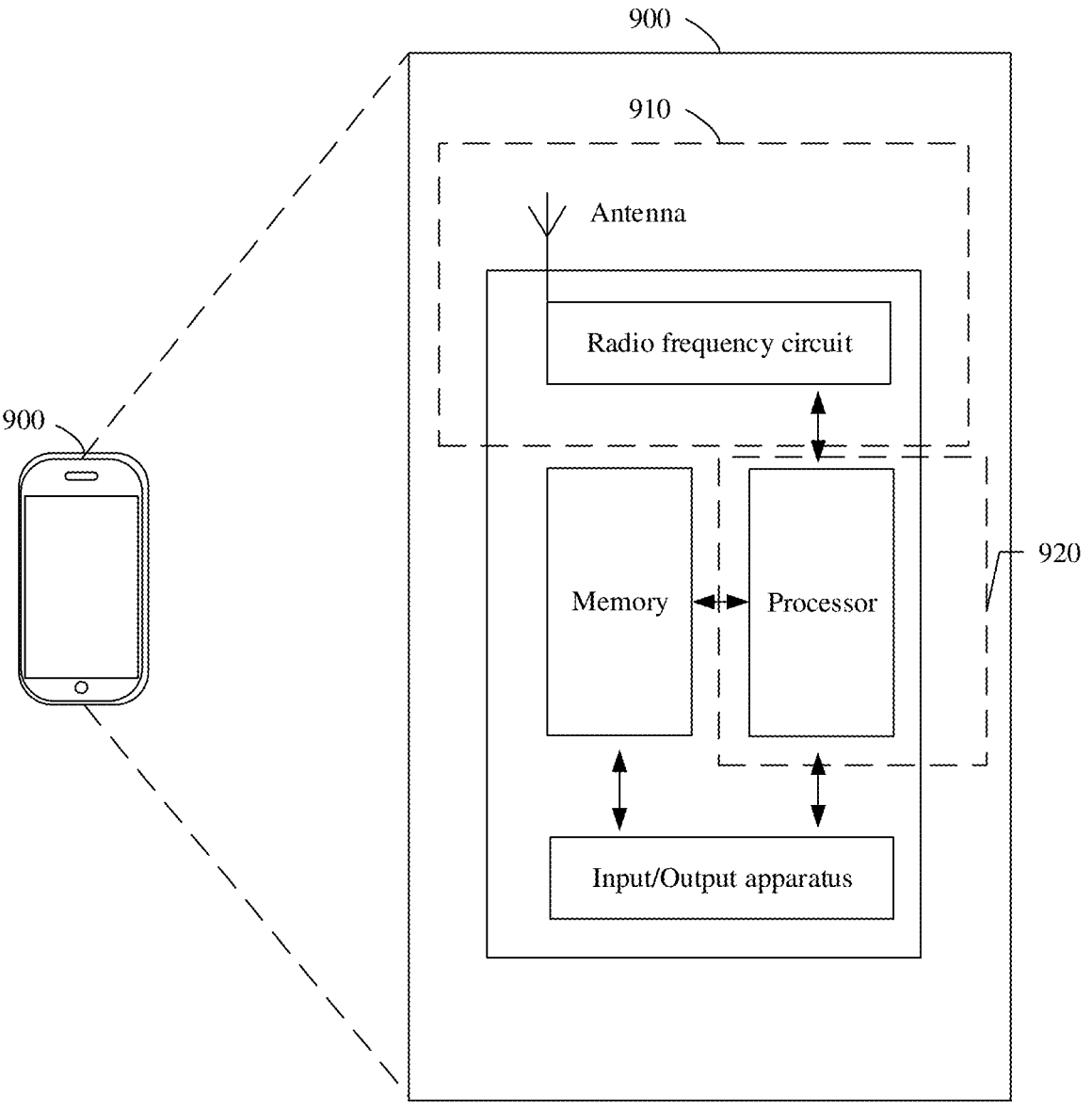
FIG. 9 is an example schematic diagram of a structure of a communication apparatus according to an embodiment of this application.

An embodiment of this application further provides a communication apparatus 900. The communication apparatus 900 may be a terminal device or a chip. The communication apparatus 900 may be configured to perform the operations performed by the terminal device in the foregoing method embodiments. When the communication apparatus 900 is a terminal device, FIG. 9 is a simplified schematic diagram of a structure of the terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive/send a radio frequency signal in a form of an electromagnetic wave. The input/output apparatus, such as a touchscreen, a display screen, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have receiving and sending functions may be considered as a transceiver unit of the terminal device, and the processor that has a processing function may be considered as a processing unit of the terminal device.

The terminal device includes a transceiver unit 910 and a processing unit 920. The transceiver unit 910 may also be referred to as a transceiver, a transceiver machine, a transceiver apparatus, or the like. The processing unit 920 may also be referred to as a processor, a processing board, a processing module, a processing apparatus, or the like.

Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

For example, in an implementation, the transceiver unit 910 is configured to perform a receiving operation of the terminal device. The processing unit 920 is configured to perform a processing action on a terminal device side.

It should be understood that FIG. 9 is merely an example instead of a limitation. The terminal device including the transceiver unit and the processing unit may not depend on the structure shown in FIG. 9.

When the communication apparatus 900 is a chip, the chip includes a transceiver unit and a processing unit. The transceiver unit may be an input/output circuit or a communication interface. The processing unit may be a processor, a microprocessor, or an integrated circuit that is integrated on the chip. The input circuit may be an input pin, the output circuit may be an output pin, and the processing circuit may be a transistor, a gate circuit, a flip-flop, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be different circuits, or may be a same circuit. In this case, the circuit is used as the input circuit and the output circuit at different moments.

It should be noted that content such as information exchange between the modules of the apparatus 900 provided in the foregoing embodiment and the execution processes thereof is based on a same concept as the method embodiments of this application, and achieves same technical effects as the method embodiments of the present technology. For specific content, refer to the foregoing descriptions in the method embodiments of this application.

Figure 10:
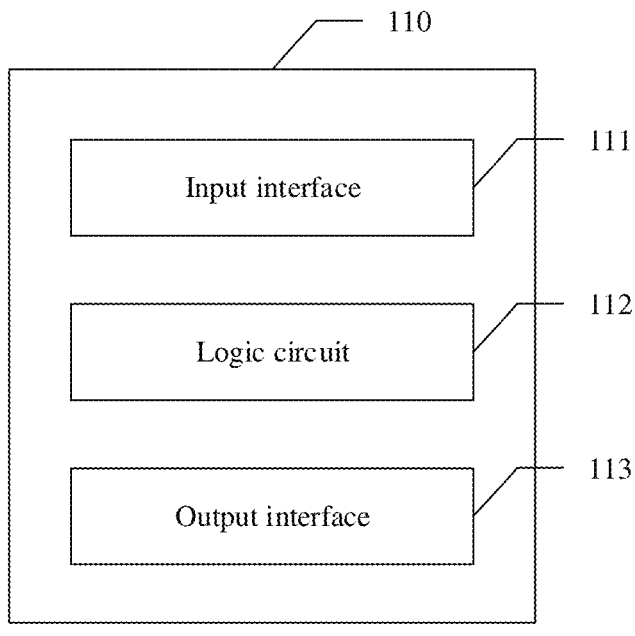
FIG. 10 is an example schematic diagram of another structure of a communication apparatus according to an embodiment of this application.

FIG. 10 shows a communication apparatus 110 according to an embodiment of this application. The communication apparatus 110 may be configured to perform the foregoing methods performed by the terminal device and the network device. The apparatus 110 may be a communication device or a chip in a communication device. As shown in FIG. 10, the apparatus 110 includes at least one input interface (Input(s)) 111, a logic circuit 112, and at least one output interface (Output(s)) 113.

Optionally, the logic circuit 112 may be a chip or another integrated circuit that can implement the method of this application.

Because specific methods and embodiments have been described above, for functions of the input interface 111, the logic circuit 112, or the output interface 113, refer to the related parts of the corresponding embodiments.

When the communication apparatus is a chip used in a terminal device, the chip in the terminal device implements the functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip used in a network device, the chip in the network device implements the functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

This application further provides a chip system. The chip system includes a processor, configured to support the foregoing terminal device or network device to implement functions related to the terminal device or network device, for example, receive or process the packet and/or information in the foregoing method embodiments. In a possible implementation, the chip system further includes a memory. The memory is configured to store program instructions and data that are necessary for a computer device. The chip system may include a chip, or may include a chip and another discrete component.

It should be further understood that there may be one or more processors in the terminal device, the network device, and the chip system in the foregoing embodiments of this application. The quantity may be adjusted based on an actual application scenario. This is merely an example for description herein and is not limited. There may be one or more memories in embodiments of this application, and this may be adjusted based on an actual application scenario. This is merely an example for description herein and is not limited.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. The sequence numbers of the foregoing processes do not mean an execution sequence, and the execution sequences of the processes should be determined based on functions and internal logic of the processes.

All or a part of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It may be understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A communication method, comprising:

determining, by a terminal device, a second polarization parameter used in association with the terminal device sending a first message:

obtaining, by the terminal device and using a first formula, a first identity based on the second polarization parameter:

sending, by the terminal device, the first message to a network device using the second polarization parameter, wherein the first message is used for requesting the network device to establish a wireless connection to the terminal device;

receiving, by the terminal device, a connection response sent by the network device, wherein the connection response comprises information for a first polarization parameter;

obtaining, by the terminal device and using the first formula, a second identity based on the information for the first polarization parameter included in the connection response:

determining, by the terminal device, whether the terminal device satisfies a match condition in association with determining whether the second identity is the same as the first identity; and accessing, by the terminal device, the network device in response to the terminal device satisfying the match condition, wherein the first identity is a first random access radio network temporary identifier (RA-RNTI), and the first formula is expressed in the following form:

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times polarization\_id.$$

2. The method according to claim 1, wherein before sending the first message to the network device, the method further comprises:

receiving, by the terminal device, configuration information sent by the network device, wherein the configuration information indicates the terminal device to configure at least one of: a sequence identity (ID), a time-frequency resource, a space domain resource, and a polarization mode of the first message, based on the configuration information.

3. The method according to claim 2, wherein the configuration information comprises index information, and the index information indicates the terminal device to configure at least one of: the sequence ID, the time-frequency resource, the space domain resource, and the polarization mode of the first message, based on the index information.

4. The method according to claim 1, wherein the second identity is a second RA-RNTI.

5. A communication method, comprising:

receiving, by a network device, a second message sent by a terminal device, wherein the second message is used for requesting the network device to establish a wireless connection to the terminal device, the second message includes a second polarization parameter, and a first identity is obtained using a first formula in association with the second polarization parameter;

determining, by the network device, a first polarization parameter based on the second message, wherein a second identity is obtained using the first formula in association with the first polarization parameter;

determining, by the network device, whether the terminal device satisfies a match condition in association with determining whether the second identity is the same as the first identity; and sending, by the network device, a connection response to the terminal device based on the terminal device satisfying the match condition, wherein the connection response comprises information for the first polarization parameter, and the connection response indicates the terminal device to access the network device, wherein the first identity is a first random access radio network temporary identifier (RA-RNTI), and the first formula is expressed in the following form:

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times polarization\_id.$$

6. The communication method according to claim 5, wherein before receiving the second message sent by the terminal device, the method further comprises:

sending, by the network device, configuration information to the terminal device, wherein the configuration information indicates the terminal device to configure at least one of: a sequence identity (ID), a time-frequency resource, a space domain resource, and a polarization mode of the second message, based on the configuration information.

7. The communication method according to claim 6, wherein the configuration information comprises index information, and the index information indicates the terminal device to configure at least one of: the sequence ID, the time-frequency resource, the space domain resource, and the polarization mode of the second message, based on the index information.

8. The communication method according to claim 5, wherein the second identity includes a second RA-RNTI.

9. A communication apparatus, comprising:

a processor; and a memory configured to store computer readable instructions that, when executed by the processor, cause the communication apparatus to:

determine a second polarization parameter used in association with the apparatus sending a first message;

obtain, using a first formula, a first identity based on the second polarization parameter;

send the first message to a network device using the second polarization parameter, wherein the first message is used for requesting the network device to establish a wireless connection to the apparatus;

receive a connection response sent by the network device, wherein the connection response comprises information for a first polarization parameter;

obtain, using the first formula, a second identity based on the information for the first polarization parameter included in the connection response;

determine whether the apparatus satisfies a match condition in association with determining whether the second identity is the same as the first identity; and access the network device in response to the apparatus satisfying the match condition, wherein the first identity is a first random access radio network temporary identifier (RA-RNTI), and the first formula is expressed in the following form:

$$RA\text{-}RNTI = 1 + s\_id + 14 \times t\_id + 14 \times 80 \times f\_id + 14 \times 80 \times 8 \times ul\_carrier\_id + 14 \times 80 \times 8 \times 2 \times polarization\_id.$$

10. The communication apparatus according to claim 9, wherein the apparatus is further caused to:

receive configuration information sent by the network device, wherein the configuration information indicates the apparatus to configure at least one of: a sequence identity (ID), a time-frequency resource, a space domain resource, and a polarization mode of the first message, based on the configuration information.

11. The communication apparatus according to claim 10, wherein the configuration information comprises index information, and the index information indicates the apparatus to configure at least one of: the sequence ID, the time-frequency resource, the space domain resource, and the polarization mode of the first message, based on the index information.

12. The method according to claim 1, wherein the first polarization parameter indicates a left-handed circular polarization mode or a right-handed circular polarization mode.

13. The method according to claim 1, wherein the network device determines whether a signal strength associated with the first message is greater than a threshold.

14. The method according to claim 1, wherein determining whether the terminal device satisfies the match conditions comprises:

determining whether a parameter field of the first polarization parameter is the same as a parameter field of the second polarization parameter, wherein the information about the first polarization parameter includes the parameter field of the first polarization parameter, and the parameter field of the second polarization parameter is obtained based on the second polarization parameter.

15. The method according to claim 1, wherein the network device configures polarization modes in different ranges including, at least, a satellite level, a cell level, a space domain or beam level, a time-frequency level, a preamble resource pool level, and a user equipment (UE) group level.

16. The communication method according to claim 5, wherein the network device configures polarization modes in different ranges including, at least, a satellite level, a cell level, a space domain or beam level, a time-frequency level, a preamble resource pool level, and a user equipment (UE) group level.

17. The method according to claim 1, wherein s_id is a start symbol index of a physical random access channel (PRACH), (0<=s_id<14), t_id is a start slot index of a PRACH in a system frame, (0<=t_id<80), f_id is a PRACH position index in frequency domain, (0<=f_id<8), ul_carrier_id is an uplink carrier for sending the connection request message, and polarization_id is a polarization parameter for sending the connection request message.

18. The communication method according to claim 5, wherein s_id is a start symbol index of a physical random access channel (PRACH), (0<=s_id<14), t_id is a start slot index of a PRACH in a system frame, (0<=t_id<80), f_id is a PRACH position index in frequency domain, (0<=s_id f_id<8), ul_carrier_id is an uplink carrier for sending the connection request message, and polarization_id is a polarization parameter for sending the connection request message.

19. The communication apparatus according to claim 9, wherein s_id is a start symbol index of a physical random access channel (PRACH), (0<=s_id<14), t_id is a start slot index of a PRACH in a system frame, (0<=t_id<80), f_id is a PRACH position index in frequency domain, (0<=f_id<8), ul_carrier_id is an uplink carrier for sending the connection request message, and polarization_id is a polarization parameter for sending the connection request message.

* * * * *